(12) United States Patent
Reddy et al.

(10) Patent No.: US 11,601,253 B2
(45) Date of Patent: Mar. 7, 2023

(54) SYNCHRONIZATION SIGNAL BLOCK DESIGN

(71) Applicant: QUALCOMM Incorporated, San Diego, CA (US)

(72) Inventors: Akula Reddy, San Diego, CA (US); Jing Sun, San Diego, CA (US); Tao Luo, San Diego, CA (US); Xiaoxia Zhang, San Diego, CA (US); Srinivas Yerramalli, Hyderabad (IN); Ahmed Abdelaziz Ibrahim Abdelaziz Zewail, San Diego, CA (US); Zhifei Fan, San Diego, CA (US); Sungwoo Park, Seoul (KR); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 16/951,665

(22) Filed: Nov. 18, 2020

(65) Prior Publication Data
US 2021/0160036 A1    May 27, 2021

Related U.S. Application Data

(60) Provisional application No. 62/940,714, filed on Nov. 26, 2019.

(51) Int. Cl.
*H04W 4/00* (2018.01)
*H04L 5/00* (2006.01)
(Continued)

(52) U.S. Cl.
CPC .......... *H04L 5/0094* (2013.01); *H04L 5/0098* (2013.01); *H04W 72/042* (2013.01);
(Continued)

(58) Field of Classification Search
None
See application file for complete search history.

(56) References Cited

U.S. PATENT DOCUMENTS

| 2019/0037509 A1* | 1/2019 | Li ........................ H04W 56/001 |
| 2019/0215790 A1 | 7/2019 | Kim et al. |

(Continued)

OTHER PUBLICATIONS

Ericsson: "SS Burst Set Composition", 3GPP TSG-RAN WG1 Meeting #88bis, 3GPP Draft, R1-1706008, SS Burst Set Composition, 3rd Generation Partnership Project (3GPP), Mobile Competence Centre, 650, Route Des Lucioles, F-06921 Sophia-Antipolis Cedex, France, vol. RAN WG1, No. Spokane, Apr. 3, 2017-Ape. 7, 2017, Mar. 25, 2017 (Mar. 25, 2017), 6 Pages, XP051252269, Retrieved from the Internet: URL: http://www.3gpp.org/ftp/tsg_ran/WG1_RL1/TSGR1_88b/Docs/ [retrieved on Mar. 25, 2017] the whole document.

(Continued)

*Primary Examiner* — Bob A Phunkulh
(74) *Attorney, Agent, or Firm* — Qualcomm Incorporated

(57) ABSTRACT

A wireless communication system utilizes a synchronization signal block (SSB) structure to enable beam switching at higher sub carrier spacing (SCS) or uplink transmissions within an SSB. The SSB structure has a first SCS for an SSB transmission and a second SCS for a data transmission. The SSB structure is based on the first SCS and the second SCS, with the SSB structure including at least one gap between SSB symbols or between SSBs. The wireless communication system transmits or receives an SSB based on the SSB structure. A base station may transmit a downlink signal during the gap, for example, where the second SCS is much greater than the first SCS. A user equipment may transmit an uplink signal such as an acknowledgment during the at least one gap. The user equipment or the base station may perform analog beam switching during the at least one gap between SSBs.

27 Claims, 13 Drawing Sheets

(51) Int. Cl.
H04W 72/0453 (2023.01)
H04W 72/04 (2023.01)
H04W 56/00 (2009.01)
H04W 74/08 (2009.01)

(52) U.S. Cl.
CPC ...... *H04W 72/0453* (2013.01); *H04W 56/001* (2013.01); *H04W 74/0883* (2013.01)

(56) References Cited

U.S. PATENT DOCUMENTS

| | | | | |
|---|---|---|---|---|
| 2019/0386862 | A1* | 12/2019 | Islam | H04L 27/26025 |
| 2020/0137596 | A1* | 4/2020 | Oh | H04W 56/0005 |
| 2020/0154376 | A1* | 5/2020 | Ko | H04W 72/005 |
| 2020/0367183 | A1* | 11/2020 | Kim | H04L 27/261 |
| 2021/0006995 | A1* | 1/2021 | Cui | H04L 27/2613 |
| 2021/0022191 | A1* | 1/2021 | Jiang | H04W 74/0891 |
| 2021/0045076 | A1* | 2/2021 | Tomeba | H04L 27/26 |
| 2021/0176687 | A1* | 6/2021 | Ko | H04W 24/08 |
| 2021/0306967 | A1* | 9/2021 | Kang | H04L 27/2655 |
| 2022/0256375 | A1* | 8/2022 | Harada | H04L 5/0053 |

OTHER PUBLICATIONS

International Search Report and Written Opinion—PCT/US2020/061378—ISA/EPO—dated Mar. 10, 2021.

* cited by examiner

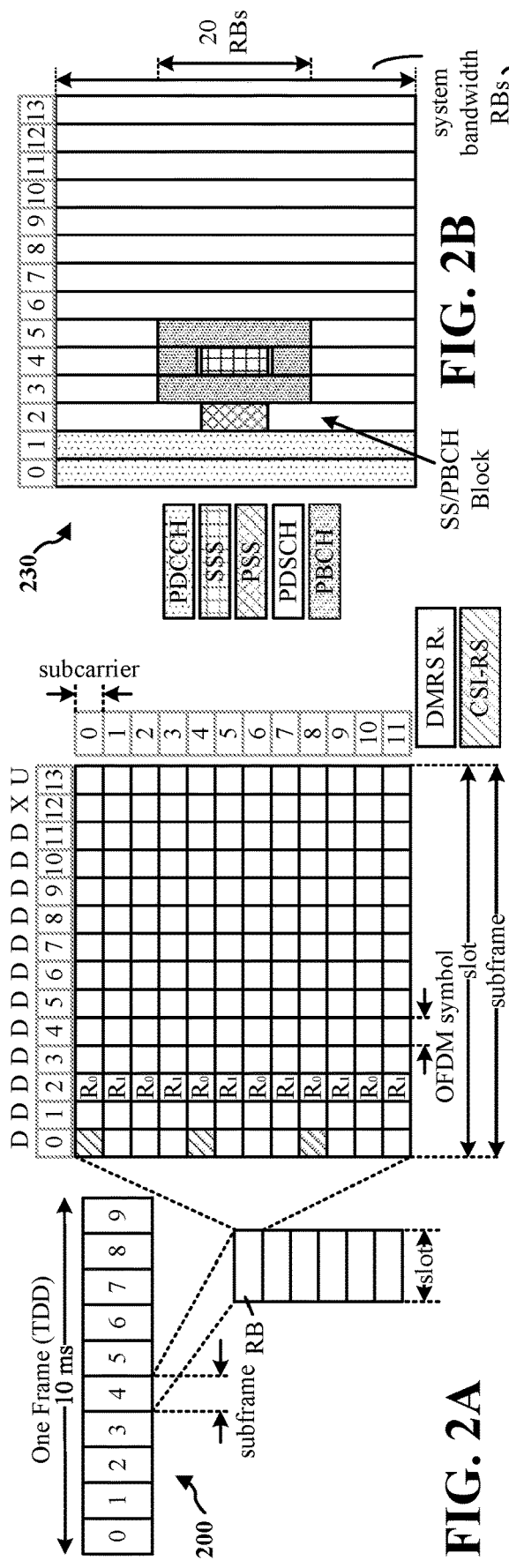
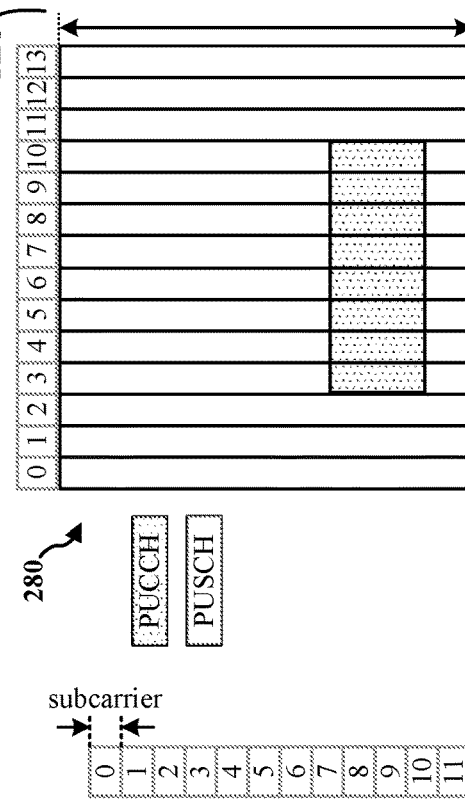
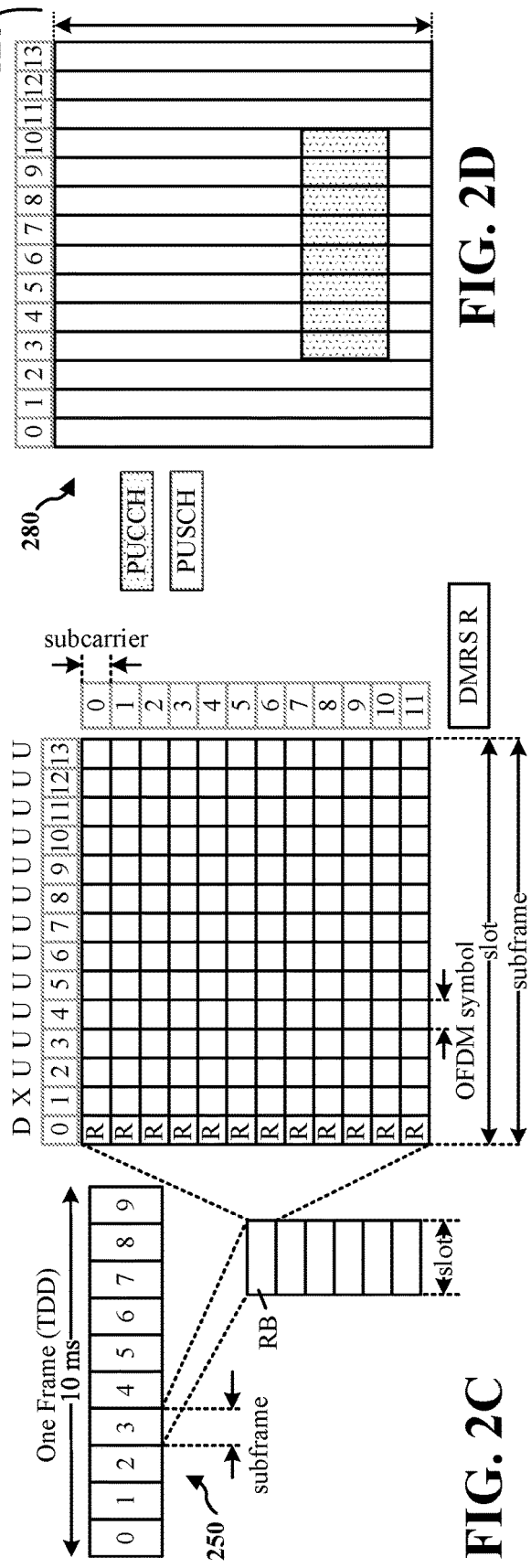

SYNCHRONIZATION SIGNAL BLOCK DESIGN

CROSS-REFERENCE TO RELATED APPLICATIONS

This application claims priority to U.S. Provisional Application No. 62/940,714 titled "SYNCHRONIZATION SIGNAL BLOCK DESIGN," filed Nov. 26, 2019, which is assigned to the assignee hereof, and incorporated herein by reference in its entirety.

BACKGROUND

Technical Field

The present disclosure relates generally to communication systems, and more particularly, to a designing a synchronization signal block for a high band new radio.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may include determining a first sub-carrier spacing (SCS) for a synchronization signal block (SSB) transmission and a second SCS for a data transmission, The method may include determining a SSB structure based on the first SCS and the second SCS, wherein the SSB structure includes at least one gap between SSB symbols or between SSBs. The method may include transmitting or receiving an SSB based on the SSB structure.

In an aspect, the apparatus may include a memory and at least one processor coupled to the memory. The processor may be configured to determine a first SCS for a SSB transmission and a second SCS for a data transmission. The processor may be configured to determine a SSB structure based on the first SCS and the second SCS, wherein the SSB structure includes at least one gap between SSB symbols or between SSBs. The processor may be configured to transmit or receive an SSB based on the SSB structure.

In another aspect, the disclosure provides an apparatus. The apparatus may include means for determining a first SCS for a SSB transmission and a second SCS for a data transmission. The apparatus may include means for determining a SSB structure based on the first SCS and the second SCS, wherein the SSB structure includes at least one gap between SSB symbols or between SSBs. The apparatus may include means for transmitting or receiving an SSB based on the SSB structure.

In another aspect, the disclosure provides a non-transitory computer-readable medium storing computer executable code. The code when executed by a processor causes the processor to determine a first SCS for a SSB transmission and a second SCS for a data transmission. The code when executed by a processor causes the processor to determine a SSB structure based on the first SCS and the second SCS, wherein the SSB structure includes at least one gap between SSB symbols or between SSBs. The code when executed by a processor causes the processor to transmit or receive an SSB based on the SSB structure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of DL channels within a subframe, in accordance with certain aspects of the present description.

FIG. 2C is a diagram illustrating an example of a second frame, in accordance with certain aspects of the present description.

FIG. 2D is a diagram illustrating an example of a UL channels within a subframe, in accordance with certain aspects of the present description.

DETAILED DESCRIPTION

Figure 1:
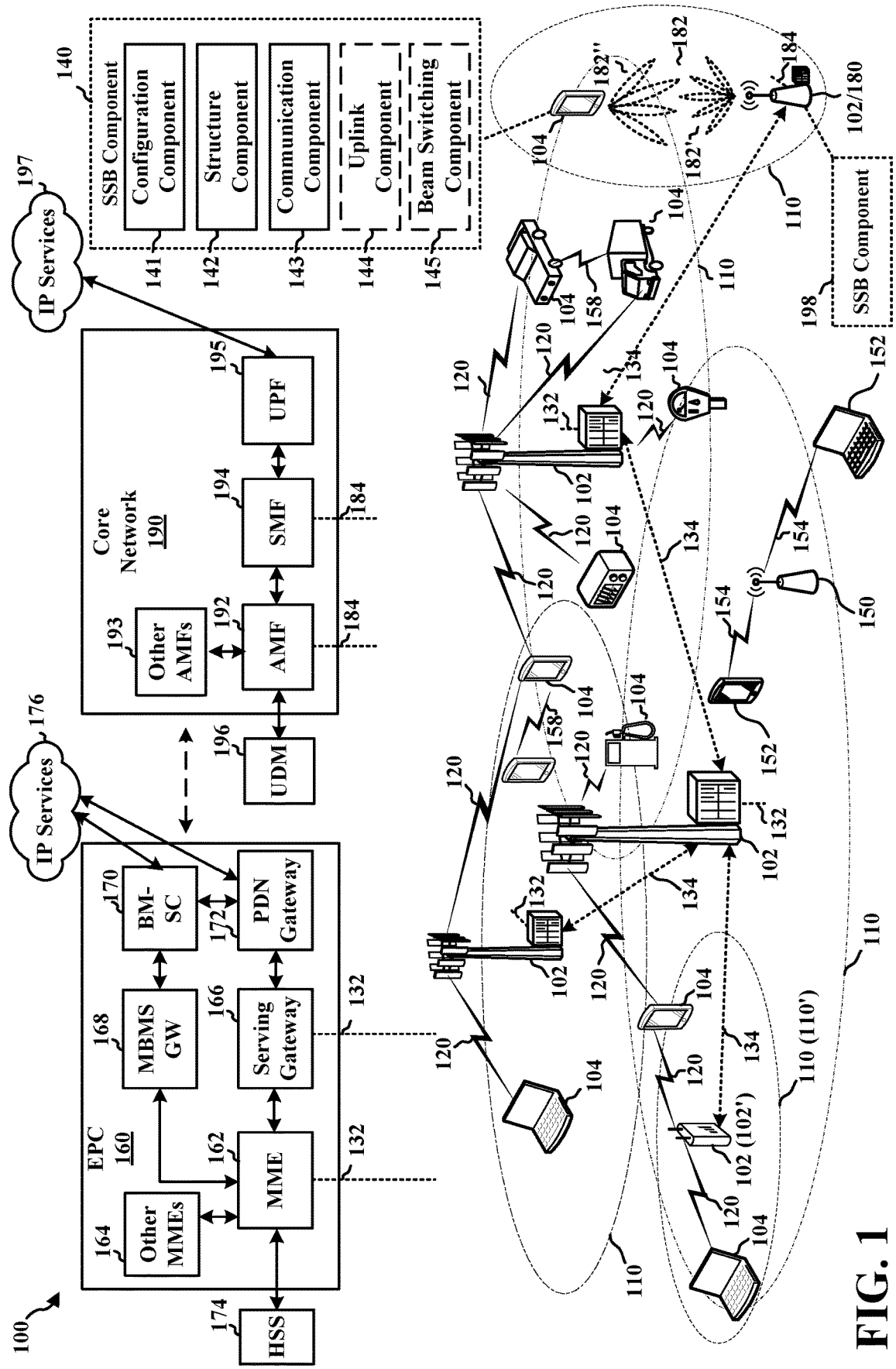
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A Synchronization Signal Block (SSB) design for 5G NR may have different patterns or structures depending on parameters such as subcarrier spacing (SCS) for both SSB symbols and data symbols, a frequency range, etc. Synchronization Signals (SS) (such as a Primary Synchronization Signal (PSS) and a Secondary Synchronization Signal (SSS)) and Physical Broadcast Channel (PBCH) channel are packed as a single block and typically placed together. When sub-carrier spacing (SCS) is scaled up, using a legacy SSB design for lower SCS (e.g., 15 kHz or 30 kHz) may introduce issues. In particular, transmitting consecutive SSB symbols in a time division duplex (TDD) system may provide no opportunity for uplink transmissions such as an uplink acknowledgement (ACK)/negative acknowledgment (NACK). When the uplink ACK/NACK is not received, the base station may assume a downlink transport block was not received and retransmit the transport block. This unnecessary retransmission may lead to a loss of data rate. As another example issue, as the SSB SCS increases and symbol duration decreases, an analog beam switching time may become a significant portion of an SSB symbol. Accordingly, the analog beam switching time may interfere with transmission of the SSB symbol.

In an aspect, an SSB structure may depend on both a SSB SCS and a data SCS. The SSB structure may include at least one gap between SSB symbols or between SSBs. Accordingly, a device may perform an uplink transmission between SSB symbols and/or perform analog beam switching between SSBs. In an aspect, the gap length between SSB symbols may depend on a ratio between the SSB SCS and the data SCS. In another aspect, the SSB design may have gaps introduced between SSBs (i.e., across the SSBs). The gap length between the SSBs may depend SSB SCS.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a SSB component 140 configured to receive a SSB. The SSB may have a structure that is based on a SCS of both the SSB and a data transmission. In particular, the SSB may have an SCS of at least 240 kHz for one or both of the SSB and the data transmission. The SSB component 140 may include a configuration component 141 that determines the configured SCS for the SSB and the data transmission, a structure component 142 that determines the structure of the SSB based on a first SCS for the SSB and a second SCS for the data transmission, and a communication component 143 that transmits or receives the SSB based on the structure of the SSB. The SSB component 140 may optionally include an uplink component that transmits or receives an uplink transmission in a gap between symbols of the SSB, or a beam switching component 145 that performs analog beam switching during a gap between SSBs.

In an aspect, one or more of the base stations 102 may include an SSB component 198. In an implementation, the SSB component 198 at the base station 102 is configured to transmit the SSB and the SSB component 140 at the UE 104 is configured to receive the SSB. Conversely, the SSB component 140 and/or uplink component 144 at the UE 104 may be configured to transmit the uplink transmission, and the SSB component 198 and/or uplink component 144 at the base station 102 may be configured to receive the uplink transmission.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A, 2B, 2C, and 2D, different example frame structures and/or resources may be utilized in base stations 102 and/or UE 104. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
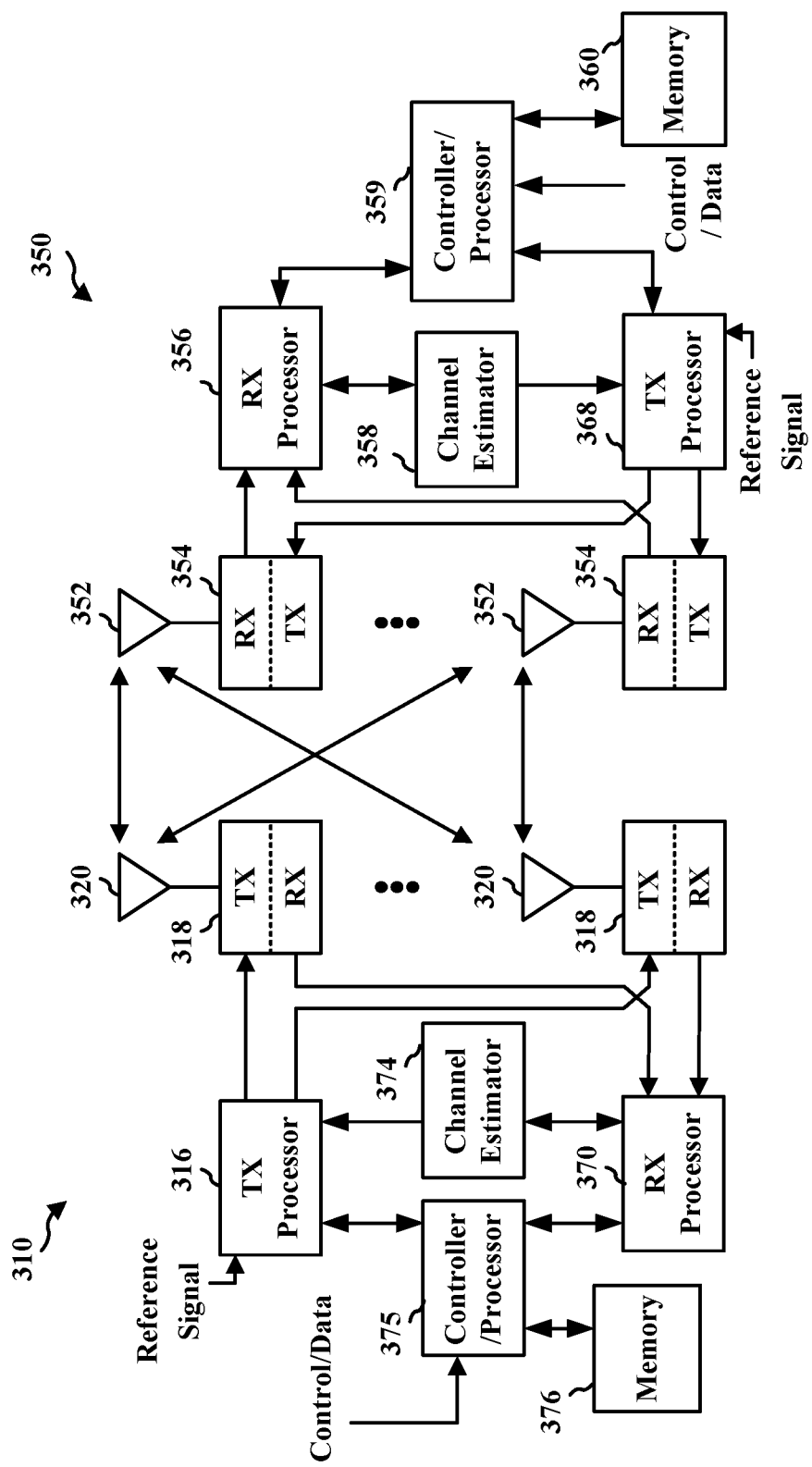
FIG. 3 is a diagram illustrating an example of a base station and user equipment (UE) in an access network, in accordance with certain aspects of the present description.

FIG. 3 is a block diagram of a base station 310 in communication with a UE 350 in an access network, where base station 310 may be the same as or similar to base station 102, e.g., including SSB component 198, and UE 350 may be the same as or similar to UE 104, e.g., including SSB component 140. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), resegmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SSB component 140 of FIG. 1.

At least one of the TX processor 316, the RX processor 370, and the controller/processor 375 may be configured to perform aspects in connection with the SSB component 198 of FIG. 1.

Figure 4:
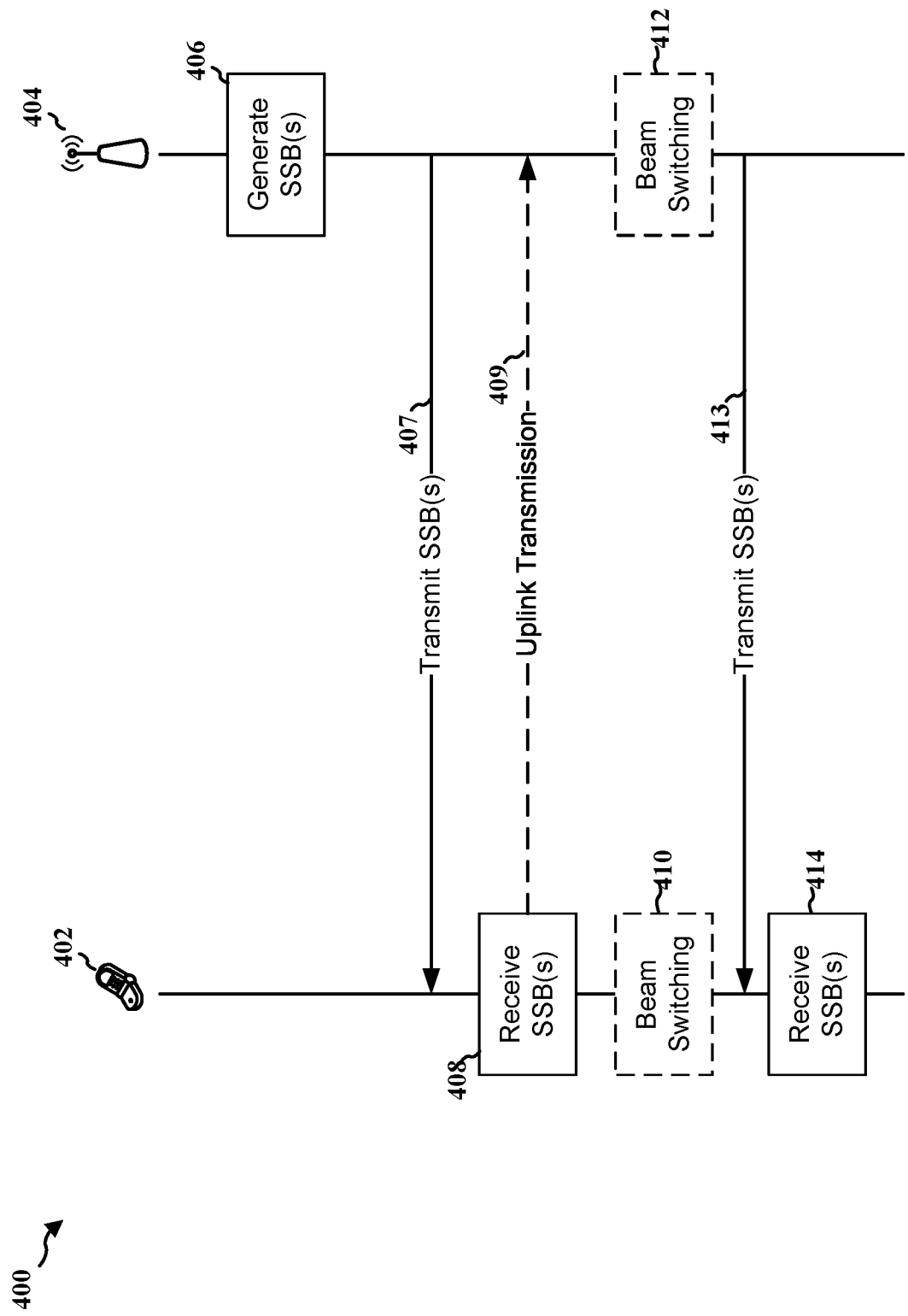
FIG. 4 is a message diagram illustrating an example message exchange between a base station and a user equipment (UE) in an access network, in accordance with certain aspects of the present description.

FIG. 4 is a diagram illustrating an example message exchange between a base station 404 and a user equipment (UE) 402 in an access network 400. The UE 402 is similar to the UE 104 as described above in reference to FIG. 1. The base station 404 is similar to the base station 102 as described above with reference to FIG. 1. The base station 404 generates an SSB(s) at block 406 and transmits the SSB(s) to the UE 402 at 407.

For example, the base station 404 generates the SSB(s) using the SSB component 198 as described above in reference to FIG. 1. The SSB(s) generated by the base station 404 may include one or more gaps in order to facilitate beam switching at the UE 402 and the base station 404. The SSB(s) generated by the base station 404 may also include one or more gaps between one or more symbols of the SSB(s) to accommodate transmission of an uplink ACK (Acknowledgement)/NACK (Negative Acknowledgement) by the UE 402. The gaps included within the SSB(s) to facilitate beam switching as well as the gaps included between one or more symbols of the SSB(s) to accommodate transmission of the uplink ACK/NACK may be based on an SSB Sub Carrier Spacing (SSB SCS) and the Data Sub Carrier Spacing (Data SCS).

At block 408, the UE 402 receives the SSB(s). Optionally, in the case where the SSB includes a gap between symbols of the SSB, the UE 402 may utilize one or more of the gaps within the symbols of the SSB received at block 408 to send an uplink transmission 409. The uplink transmission 409 may include an ACK/NACK indicating whether a last data block was successfully received.

At blocks 410 and 412 the UE 402 and/or the base station 404 may perform beam switching. Beam switching may allow the base station 404 and the UE 402 to find a best beam for communication. Beam switching may be digital beam switching or analog beam switching. For digital beam switching, the UE 402 or base station 404 may change weights applied to different antennas (e.g., according to a beamforming matrix). For analog beam switching, the UE 402 or the base station 404 may change a phase of an antenna array. The UE 402 and/or the base station 404 may perform beam switching based on a beam for the next SSB to be transmitted. In an aspect, analog beam switching may take a certain amount of time. For instance, analog beam switching may take approximately 100 nanoseconds. As the SCS increases and the symbol period decreases, the analog beam switching time may be too great to perform during a time period of a symbol. As such, according to the present aspects, the UE 402 and the base station 404 may utilize one or more gaps between the SSB(s) blocks (generated at block 406) to perform beam switching at block 410 and 412.

After the UE 402 and the base station 404 perform beam switching at blocks 410 and 412, the base station 404 may transmit another SSB(s) to the UE 402 at 413. The SSB(s) transmitted by the base station 404 at 413 may be similar to the SSB(s) generated at block 406. For simplicity, the SSB(s) generation after blocks 410 and 412 is not shown. At block 414, the UE 402 receives the SSB(s) transmitted by the base station 404 in a similar manner as the SSB(s) received by the UE 402 at block 408, in some cases, receiving the SSB(s) on the new beam according to the beam switching at block 410.

Figure 5:
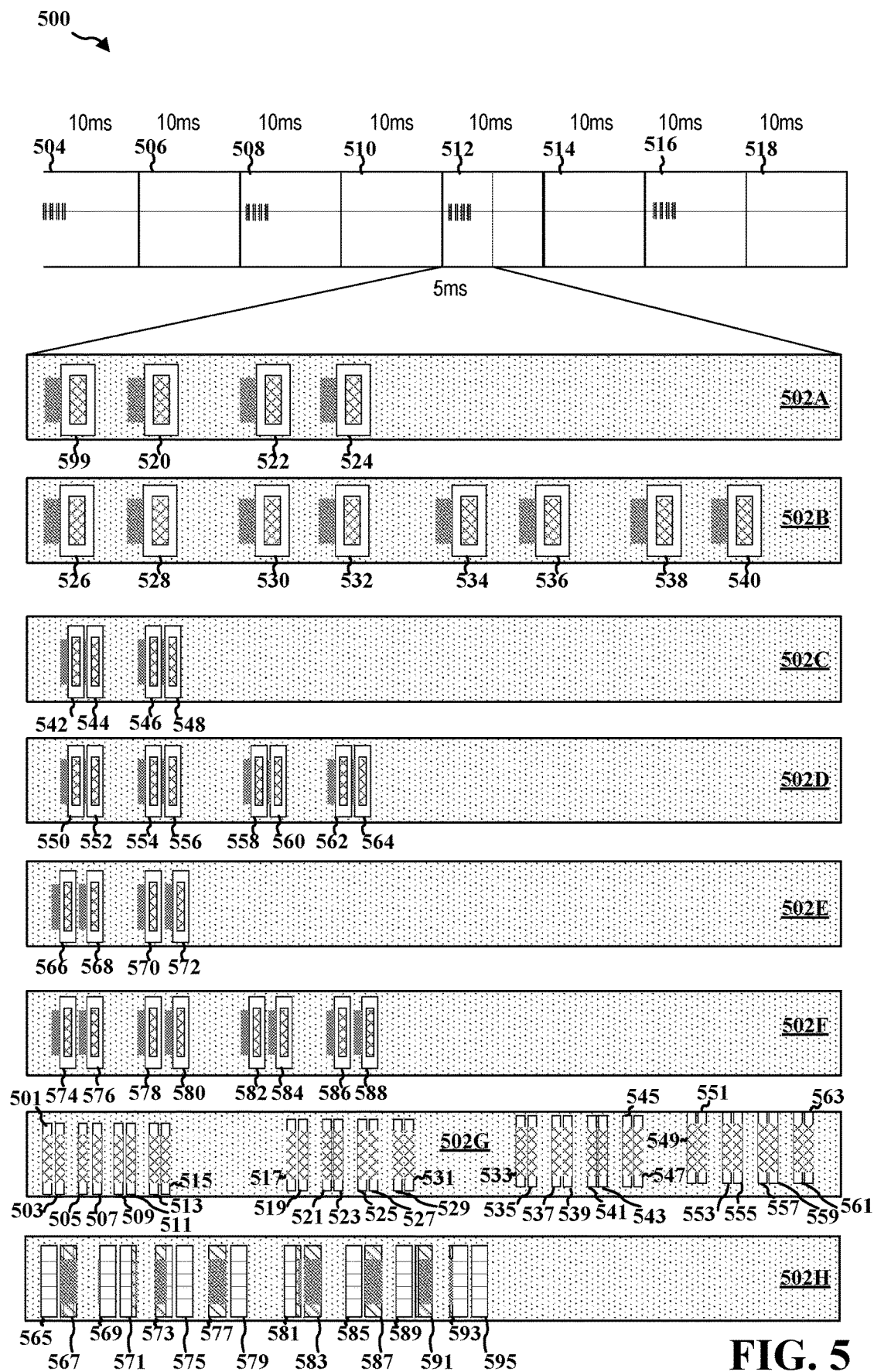
FIG. 5 is a diagram illustrating an example of Synchronization Signal Blocks (SSBs) at different carrier frequencies and different Sub Carrier Spacings (SCSs), in accordance with certain aspects of the present description.

FIG. 5 is a diagram illustrating an example of SSBs at different carrier frequencies and different SCSs that may be transmitted by base station 102 and/or received by UE 104. FIG. 5 includes a signal 500 with 10 millisecond (ms) frames 504, 506, 508, 510, 512, 514, 516, and 518. FIG. 5 also includes expanded views of alternative, different example SSB sets 502A-502H at different carrier frequencies and SCSs of the first 5 ms of the 10 ms frame 512. The expanded views of example SSB sets 502A-502H illustrate different modes in which an SSB may be transmitted. A synchronization signal (such as a Primary Synchronization Signal (PSS) or a Secondary Synchronization Signal (SSS)) and Physical Broadcast Channel (PBCH) are typically packed as a single block and placed together as an SSB. The PBCH may include Physical Broadcast Channel Demodulation Reference Signals (PBCH DMRS) and PBCH Data Signals.

Example SSB set 502A is an example of the signal 500 having a carrier frequency of less than or equal to 3 GHz (Gigahertz) and an SCS of 15 kHz (Kilohertz). For the carrier frequency of less than or equal to 3 GHz, 4 SSBs may be transmitted. Accordingly, example SSB set 502A includes SSBs 599, 520, 522 and 524, each of which may include PSS, SSS, and PBCH symbols as described above with reference to FIG. 2B.

Example SSB set 502B is an example of the signal 500 having a carrier frequency of less than or equal to 6 GHz and an SCS of 15 kHz. For the carrier frequency of less than or equal to 6 GHz, 8 SSBs may be transmitted. Accordingly, example SSB set 502B includes SSBs 526, 528, 530, 532, 534, 536, 538 and 540.

Example SSB set 502C is an example of the signal 500 having a carrier frequency of less than or equal to 3 GHz and an SCS of 30 kHz. Because the SCS of 30 kHz is twice the SCS of 15 kHz in example SSB set 502A, the symbol period in example SSB set 502C is half of the symbol duration in example SSB set 502A. Accordingly, the SSBs 542, 544, 546 and 548 in example SSB set 502C may be transmitted in half the time. With an increase in SCS from 15 kHz to 30 kHz (comparing SSB set 502A with SSB set 502C), the spacing between SSBs may be reduced as illustrated in FIG. 5.

Example SSB set 502D is an example of the signal 500 having a carrier frequency of less than or equal to 6 GHz and an SCS of 30 kHz. Similar to example SSB set 502C, the symbol period for example SSB set 502D is half of the symbol period of example SSB set 502B. Accordingly, in example SSB set 502D, the 8 SSBs 550, 552, 554, 556, 558, 560, 562 and 564 may be transmitted in half the time compared to example SSB set 502B and the space between symbols may be reduced.

Example SSB set 502E is an example of the signal 500 having a carrier frequency of less than or equal to 3 GHz and an SCS of 30 kHz. Example SSB set 502E includes 4 SSBs 566, 568, 570 and 572.

Example SSB set 502F is an example of the signal 500 having a carrier frequency of less than or equal to 6 GHz and an SCS of 30 kHz. Example SSB set 502F includes SSBs 574, 576, 578, 580, 582, 584, 586 and 588.

Example SSB set 502G is an example of the signal 500 having a carrier frequency of less than or equal to 6 GHz and an SCS of 120 kHz. Example SSB set 502G includes 32 SSBs 501, 503, 505, 507, 509, 511, 513, 515, 517, 519, 521, 523, 525, 527, 529, 531, 533, 535, 537, 539, 541, 543, 545, 547, 549, 551, 553, 555, 557, 559, 561 and 563.

Example SSB set 502H is an example of the signal 500 having a carrier frequency of less than or equal to 6 GHz and an SCS of 240 kHz. Example SSB set 502H includes 16 SSBs 565, 567, 569, 571, 573, 575, 577, 579, 581, 583, 585, 587, 589, 591, 593 and 595.

Figure 6:
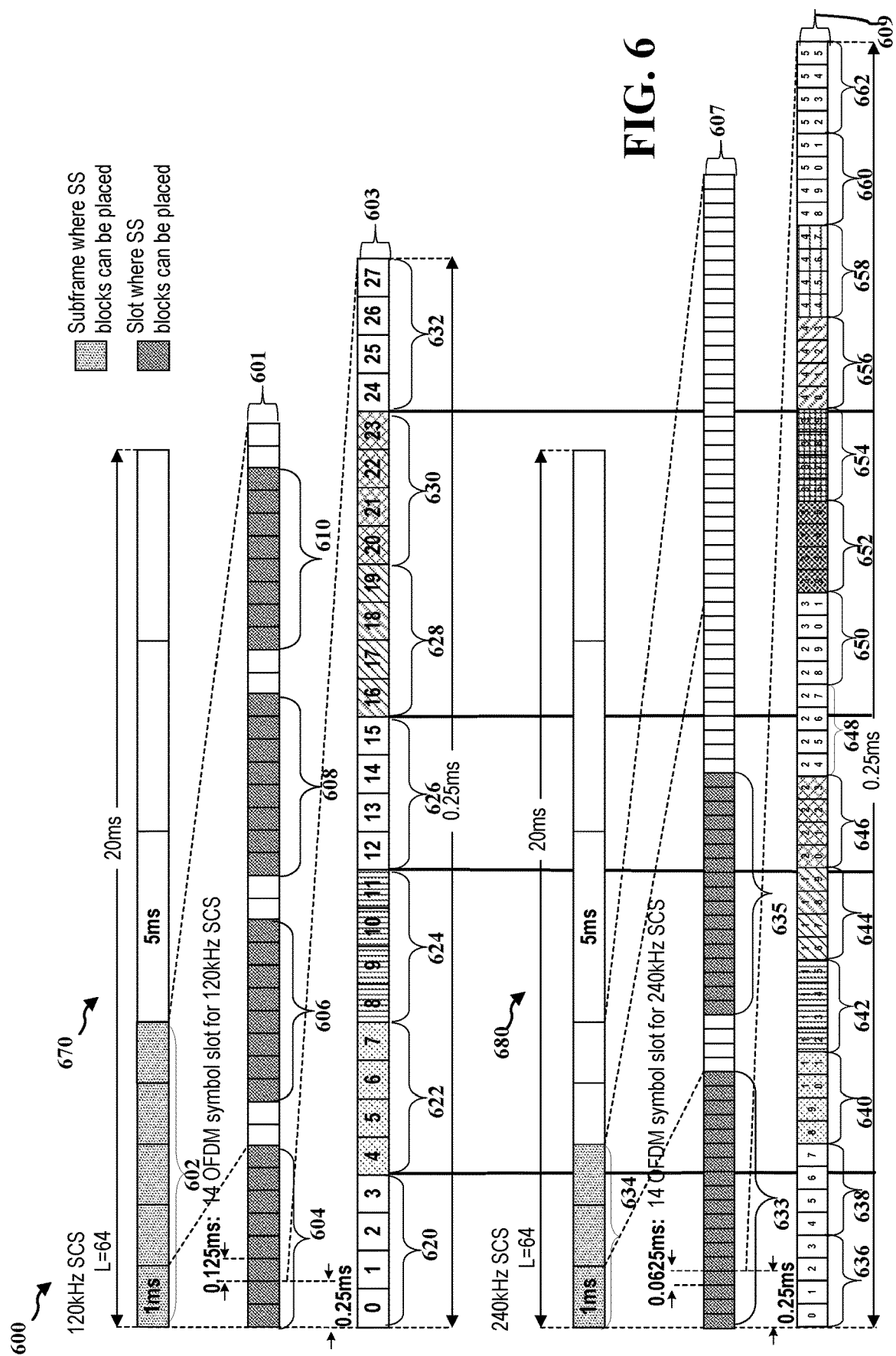
FIG. 6 is a diagram illustrating an example of Synchronization Signal Blocks (SSBs) with no spacing between the SSBs or between symbols of the SSBs and possible positions for introducing gaps, in accordance with certain aspects of the present description.

FIG. 6 is a diagram 600 illustrating two example patterns for transmitting SSBs where no spacing between the SSBs or between symbols of the SSBs is utilized. Specifically, diagram 600 includes a first SSB pattern associated with a 20 ms SSB period having a 120 kHz SCS, and a second SSB pattern associated with a 20 ms SSB period having a 240 kHz SCS.

The first pattern 670 associated with the first 20 ms SSB period having the 120 kHz SCS includes a sub-block 602 that is a 5 ms half frame of the 20 ms SSB period designated for SSB transmission. Further, block 601 is an expanded view of the sub-block 602. The block 601 includes 0.125 ms wide slots. A group of 8 such 0.125 ms slots (1 ms) make up sub-blocks 604, 606 and 608. The sub-blocks 604, 606, 608 and 610 represent sub-blocks in which SSBs can be transmitted. The sub-block 602 may include four of the 1 ms sub-blocks 604, 606, 608, and 610 spaced apart by two slots. Each of the 0.125 ms slots of the block 601 may accommodate 14 Orthogonal Frequency Division Multiplexing (OFDM) symbols of for an SCS of 120 kHz.

Further, block 603 is an expanded view of a 0.25 ms duration (e.g., 2 slots) of the sub-block 604. As described above, a 0.125 ms slot of the block 601 can accommodate 14 OFDM symbols. The block 603 represents the expanded view of the 0.25 ms duration with 28 OFDM symbols that can be accommodated with the OFDM symbols numbered 0-27. An SSB pattern may repeat at the symbol level over the 0.25 ms duration. Sub-locks 620 (OFDM symbols 0-3 in the block 603), 622 (OFDM symbols 4-7 in the block 603), 624 (OFDM symbols 8-11 in the block 603), 626 (OFDM symbols 12-15 in the block 603), 628 (OFDM symbols 16-19 in the block 603), 630 (OFDM symbols 20-23 in the block 603) and 632 (OFDM symbols 24-27 in the block 603) represent sub-blocks each of which can accommodate 4 OFDM symbols, which may be used for transmitting an SSB. In this example, SSBs are included in the sub-blocks 622, 624, 628 and 630. The sub-blocks 622 and 624 do not include any spaces between the symbols of the SSBs, e.g., between OFDM symbols 4 and 5, 5 and 6, 6 and 7, etc. That is, 8 SSB symbols may be transmitted consecutively such that the SSB is received over a short period. Similarly, 8 SSB symbols may be transmitted consecutively in sub-blocks 628 and 630. No SSBs may be transmitted in sub-blocks 620, 626, and 632.

The second pattern 680 associated with the second 20 ms SSB period having the 240 kHz SCS includes a sub-block 634 that represents a 3 ms section of the 20 ms SSB period in which SSBs may be transmitted. Further, block 607 is an expanded view of the sub-block 634. The block 607 includes 0.0625 ms slots, and a group of 16 such 0.0625 ms slots make up sub-blocks 633 and 635. The sub-blocks 633 and 635 represent sub-blocks in which SSBs can be placed. Each of the 0.0625 ms slots may accommodate 14 OFDM symbols for an SCS of 240 kHz.

Additionally, block 609 is an expanded view of the 0.25 ms duration of the sub-block 633 including SSBs. As described above, a 0.0625 ms slot of the block 607 can accommodate 14 OFDM symbols. The sub-block 633 represents the expanded view of the 0.25 ms duration with 56 OFDM symbols that can be accommodated with the OFDM symbols numbered 0-55. An SSB pattern may be repeated at a symbol level over the 0.25 ms duration. Sub-blocks 636 (OFDM symbols 0-3 in the block 609), 638 (OFDM symbols 4-7 in the block 609), 640 (OFDM symbols 8-11 in the block 609), 642 (OFDM symbols 12-15 in the block 609), 644 (OFDM symbols 16-19 in the block 609), 646 (OFDM symbols 20-23 in the block 609) and 648 (OFDM symbols 24-27 in the block 609), 650 (OFDM symbols 28-31 in the block 609), 652 (OFDM symbols 32-35 in the block 609), 654 (OFDM symbols 36-39 in the block 609), 656 (OFDM symbols 40-43 in the block 609), 658 (OFDM symbols 44-47 in the block 609), 660 (OFDM symbols 48-51 in the block 609) and 662 (OFDM symbols 52-55 in the block 609) represent sub-blocks each of which can accommodate 4 OFDM symbols. In this example, SSBs are included in the sub-blocks 640, 642, 644, 646, 652, 654, 656 and 658, and the sub-blocks 640, 642, 644, 646, 652, 654, 656 and 658 do not include spaces between the symbols of the SSBs, e.g., between OFDM symbols 8 and 9, 9 and 10, etc. Further, the sub-blocks 640, 642, 644, 646, 652, 654, 656 and 658 do not include spaces between OFDM symbols 11 and 12, 15 and 16, etc. No SSBs may be transmitted in sub-blocks 636, 638, 648, 650, 660 and 662.

In the above example of the SSB pattern 670 at 120 kHz SCS, the different sets of 4 SSBs at sub-blocks 622, 624, 628 and 630 do not include spaces between the different SSBs, e.g., between OFDM symbols 7 and 8, 19 and 20, etc. With no spacing between the SSBs included between the sub-blocks 622 and 624, or between sub-blocks 628 and 630, beam switching may only occur during the SSB symbols of a respective SSB. Similarly, in the above example of the SSB pattern at 240 kHz SCS, there is no spacing between the two different sets of 4 SSBs included in the sub-blocks 640, 642, 644, and 646, and in sub-blocks 652, 654, 656 and 658. With no gap between the OFDM symbols between each of the SSBs at sub-blocks 640, 642, 644, 646, 652, 654, 656 and 658, beam switching may only occur during the SSB symbols.

At the 120 kHz SCS and the 240 kHz SCS, a 200 nanoseconds beam switching time may not affect an ability of the receiving device to receive a signal in the portion of the symbols that remains after performing the beam switching. For example, at the 120 kHz SCS, the 200 nanosecond duration for performing the beam switching may be a sufficiently small time period so as to not significantly affect receipt of a signal in a 0.03125 ms (31,250 ns) symbol. A similar rationale applies in the case of the 240 kHz SCS example.

However, the time duration of the beam switching may utilize a sufficiently large portion of the symbol duration so as to result in the receiving device not being able to properly receive a signal in the symbol. For example, at an SCS value of 960 kHz, a 200 nanoseconds beam switching time may take up a significant portion of the 3,906 ns time duration of the symbol. Accordingly, a receiving device may not be able to receive the signal in the portion of the symbol that remains after performing the beam switching.

Additionally, in both of the 120 kHz SCS and 240 kHz SCS examples, the symbols of the SSB are transmitted consecutively. Accordingly, there are no gaps within each SSB that allow for uplink transmissions. For example, there is no gap between the OFDM symbols of each SSB in the sub-blocks 622, 624, 628 and 630 of the 120 kHz SCS pattern example. Similarly, there is no spacing within the SSBs included in the sub-blocks 640, 642, 644, 646, 652, 654, 656 and 658 of the 240 kHz SCS pattern example. As such, there may be data loss due to lack of spacing available for sending uplink ACK/NACK. For example, one or more SSBs may be transmitted over multiple consecutive OFDM symbols (e.g., OFDM symbols 4-11 or 15-23). Each SSB OFDM symbol may have the same duration as multiple data symbols. With no gaps between the consecutive OFDM symbols, an ACK/NACK may not be transmitted in the uplink communication. With the SSB design of sub-blocks 622, 624, 628 and 630, data loss may result if a higher data SCS is used. For example, due to lack of sending of ACK/NACK the transmitter may assume the corresponding downlink symbols were not received and may retransmit the downlink symbols.

Accordingly, to address one or more of the above issues, the present aspects propose one or more new SSB patterns, where the patterns or structures may vary depending on parameters such as SCS for both SSB symbols and data symbols, a frequency range, etc.

Figure 7:
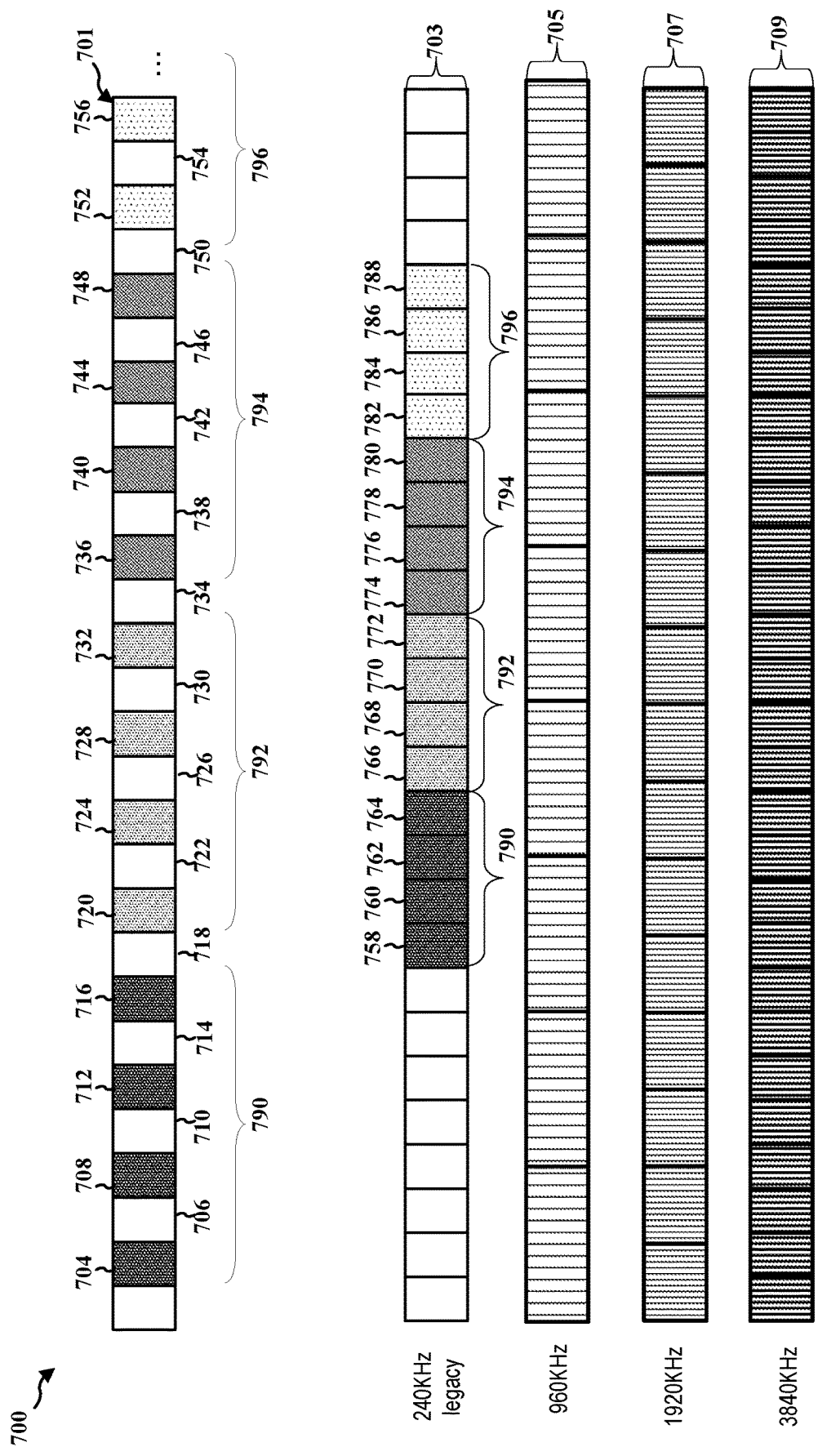
FIG. 7 is a diagram illustrating an example SSB pattern with gaps introduced after each symbol of the SSB as well as between multiple SSBs, in accordance with certain aspects of the present description.

FIG. 7 is a diagram 700 illustrating an example SSB pattern 701 with gaps introduced after each SSB symbol as well as between multiple SSBs, as compared to the legacy 240 kHz SCS SSB pattern 703 and corresponding example frame structures of different alternative data SCS values, e.g., a 960 kHz SCS 705, a 1920 kHz SCS 707, and a 3840 kHz SCS 709. The SSB pattern 701 is a gap-inserted version of a legacy SSB pattern 703 (with a 240 kHz SCS) to enable uplink transmissions within SSBs and beam switching between SSBs.

The legacy SSB pattern 703 includes an SSB 790 (with OFDM symbols 758-764), an SSB 792 (with OFDM symbols 766, 768, 770, 772), an SSB 794 (with OFDM symbols 774, 776, 778, 780) and an SSB 796 (with OFDM symbols 782, 784, 786, 788) and without any gaps between the symbols of the SSBs (i.e., the OFDM symbols 758, 760, 762, etc.) or the multiple SSBs (i.e., the SSB 790, the SSB 792, etc.). The legacy SSB pattern 703 is similar to the signal block 607 as described above with reference to FIG. 6.

The SSB pattern 701 includes SSBs 790, 792 794, and 796 that correspond to the SSBs in the legacy SSB pattern 703, however, the SSB pattern 701 includes gaps between the OFDM symbols of each SSB.

For example, as indicated by SSB 790, the OFDM symbols 704, 708, 712 and 716 of the SSB pattern 701 correspond to the OFDM symbols 758, 760, 762 and 764 of the legacy SSB pattern 703. Further, the OFDM symbols 704, 708, 712 and 716 in the SSB pattern 701 are spaced apart by the OFDM symbols 706, 710 and 714, respectively. Accordingly, the OFDM symbols for the SSB 790 are not consecutive in the SSB pattern 703, and thereby an uplink transmission may be transmitted in a gap between SSB symbols (e.g., in the OFDM symbol 710).

Similarly, as indicated by SSB 792, the OFDM symbols 720, 724, 728 and 732 of the SSB pattern 701 correspond to the OFDM symbols 766, 768, 770 and 772 of the legacy SSB pattern 703, with the difference that the OFDM symbols 720, 724, 728 and 732 are spaced by the inserted OFDM symbols 722, 726 and 730, respectively. Also, as indicated by SSB 794, the OFDM symbols 736, 740, 744 and 748 of the SSB pattern 701 correspond to the OFDM symbols 774, 776, 778 and 780 of the legacy SSB pattern 703, with the difference that the OFDM symbols 736, 740, 744 and 748 are spaced by the inserted OFDM symbols 738, 742 and 746 respectively. Similarly, as indicated by SSB 796, OFDM symbols 744 and 746 in the SSB pattern 701 correspond to the OFDM symbols 782 and 784 in the legacy SSB pattern 703. For the purpose of simplicity only the OFDM symbols 752 and 756 of the SSB 796 are shown. However, gaps between OFDM symbols for the SSB 796 include OFDM symbol 754 and additional symbols in a similar manner in the SSB pattern 701 as for the corresponding OFDM symbols of the SSB 790, the SSB 792, and the SSB 794.

The gaps between the OFDM symbols of the SSBs of the SSB pattern 701 allow an uplink transmission, such as an uplink ACK/NACK, to be included within a time period for the SSB. In an aspect, the uplink transmission may use the data SCS, which may have a greater or higher value than the SSB SCS. For example, the data SCS may be 960 kHz SCS 705, 1920 kHz SCS 707, or 3840 kHz SCS 709, while the SSB SCS may be 240 kHz. These relatively higher data SCSs values allow multiple symbols to be transmitted during a gap of 1 symbol of the SSB SCS. For example, if the SSB pattern 701 has a frequency or SCS value of 240 kHz and the data pattern has a frequency or SCS value of 3.84 MHz, then 1 SSB symbol would be equal to 16 data symbols in time. As such, a gap such as the OFDM symbol 706 in the SSB pattern 701 may allow up to 16 symbols of data to be transmitted. This gap may be utilized for sending the uplink signals such as ACK/NACK to the transmitter. For instance, a gap of 16 symbols may allow 1 symbol to switch from downlink direction to uplink direction, a full 14 symbol slot for uplink, and 1 symbol to switch from uplink direction to downlink direction. The 14 symbol slot may not be aligned with the slot boundary according to the SSB SCS.

Further, the SSB pattern 701 may include gaps between the different SSBs, e.g., between SSBs 790, 792, 794, and 796, that enable performing beam switching without interfering with SSB signal reception. For example, in an implementation, the last OFDM symbol 716 of SSB 790 and the first OFDM symbol 720 of SSB 792 in the SSB pattern 701 are spaced by the OFDM symbol 718, the OFDM symbols 732 and 736 are spaced by the OFDM symbol 734, and the OFDM symbols 748 and 752 are spaced by the OFDM symbol 750. The gaps represented by the OFDM symbols 718, 734, and 750 correspond to gaps between SSBs that facilitates beam switching, as discussed above with reference to FIGS. 4-6.

As discussed above with reference to FIG. 6, a legacy SSB pattern may repeat over a 0.25 ms duration (56 symbols), and include 8 SSBs per repetition. Accordingly, a 1 ms duration may include 32 total SSBs and be repeated 2 times with 3 ms of the 5 ms half frame for a total of 64 beams. With the SSB pattern 701, 8 SSBs repeated 4 times with gaps between each symbol would use 256 symbols or 1.1429 ms. A gap between SSB bursts may be shortened to 0.1071 ms (24 symbols) with a final gap of 0.6429 ms for the 3 ms. Therefore, with the gaps inserted in the SSB pattern 701, a 64 beam sweeping space can be accommodated.

Figure 8:
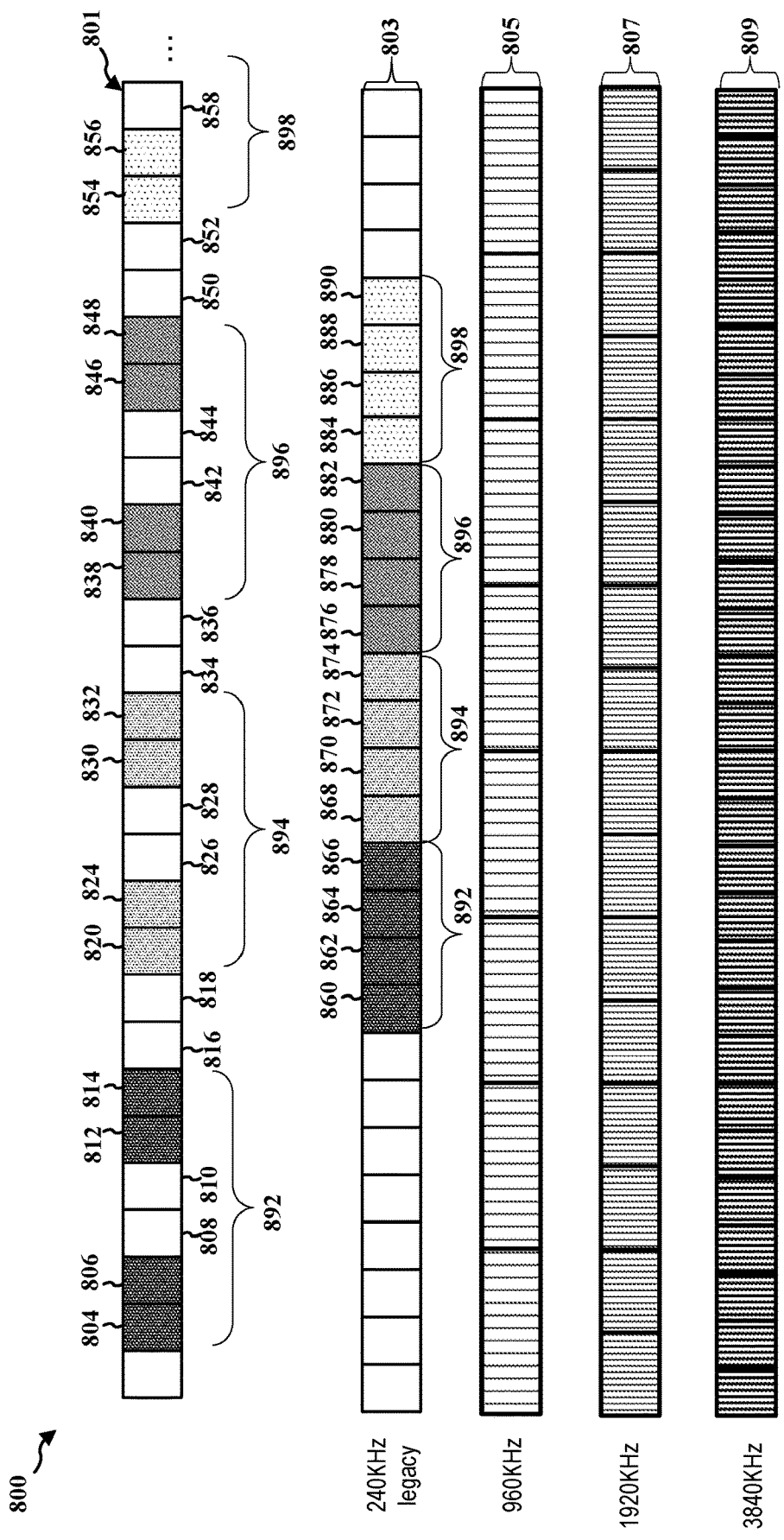
FIG. 8 is a diagram illustrating another example SSB pattern with gaps introduced between symbols of the SSB as well as between multiple SSBs, in accordance with certain aspects of the present description.

FIG. 8 is a diagram 800 illustrating another example of a partial SSB pattern 801 (shortened for simplicity) with gaps introduced between symbols of the SSB as well as between multiple SSBs, and as compared to the legacy 240 kHz SCS SSB pattern 803 and corresponding example frame structures of different alternative data SCS values, e.g., a 960 kHz SCS 805, a 1920 kHz SCS 807, and a 3840 kHz SCS 809. The gaps in the SSB pattern 801 are similar to the gaps in the SSB pattern 701 as described above with reference to FIG. 7, however, the gaps in the SSB pattern 801 include two OFDM symbols instead of a single OFDM symbol in the SSB pattern 701. The gaps of two SSB symbols may allow a greater number of data symbols to be transmitted within the gap. For example, a full 14 symbol slot may be transmitted in the gap when the data SCS is 8 times the SSB SCS.

The legacy SSB pattern 803 is the same as the legacy SSB pattern 703 of FIG. 7, and in this case includes an SSB 892 (with OFDM symbols 860, 862, 864, 866), an SSB 894 (with OFDM symbols 868, 870, 872, 874), an SSB 896 (with OFDM symbols 876, 878, 880, 882) and an SSB 898 (with OFDM symbols 884, 886, 888, 890) and without any gaps between the symbols of the SSBs (i.e., the OFDM symbols 860, 862, 864, etc.) or the multiple SSBs (i.e., the SSB 892, the SSB 894, etc.). The legacy SSB pattern 803 is similar to the signal block 607 as described above with reference to FIG. 6.

The SSB pattern 801 is a gap-inserted version of the legacy SSB pattern 803. As indicated by the SSB 892, the OFDM symbols 804, 806, 812 and 814 of the SSB pattern 801 correspond to the OFDM symbols 860, 862, 864 and 866 of the legacy SSB pattern 803. The OFDM symbols 804 and 806, and the OFDM symbols 812 and 814 in the SSB pattern 801 are spaced by the two OFDM symbols 808 and 810 forming a gap.

Similarly, as indicated by the SSB 894, the OFDM symbols 868, 870, 872 and 874 of the legacy SSB pattern 803 correspond to the OFDM symbols 820, 824, 830 and 832 with the difference that the OFDM symbols 820, 824 and the OFDM symbols 830 and 832 are spaced by the OFDM symbols 826 and 828. Also, as indicated by the SSB 896, the OFDM symbols 876, 878, 880, and 882 of the legacy SSB pattern 803 correspond to the OFDM symbols 838, 840, 846, and 848 of the SSB pattern 801 with the difference that the OFDM symbols 838, 840 and the OFDM symbols 846 and 848 are spaced by the OFDM symbols 842 and 844. For the purpose of simplicity only the OFDM symbols 854 and 856 of the SSB 898 are not shown. However, the SSB 898 includes gaps created by the OFDM symbol 858 and additional OFDM symbols in a similar manner in the SSB pattern 801 as for the corresponding OFDM symbols of the SSB 892, the SSB 894, and the SSB 896.

The gap formed by OFDM symbols 808 and 810 allows transmission of an uplink transmission such as ACK/NACK. In an aspect, the uplink transmission may use the data SCS, which may be greater than the SSB SCS. For example, the data SCS may be 960 kHz SCS 805, 1920 kHz SCS 807, or 3840 kHz SCS 809. These higher SCSs allow multiple symbols to be transmitted during a gap of 2 symbols of the SSB SCS. For example, if the SSB pattern 801 has a frequency of 240 kHz and an uplink data transmission has a SCS of 3.84 MHz, then 1 SSB symbol would be equal to 16 data symbols in time. A gap presented by the OFDM symbols 808 and 810 in the SSB pattern 801, may allow up to 32 symbols of data. This gap may be utilized for sending uplink signals such as ACK/NACK to the transmitter.

Further, the OFDM symbols 814 and 820 are spaced by the OFDM symbol 816 and 818, the OFDM symbols 832 and 838 are spaced by the OFDM symbol 834 and 836, and the OFDM symbols 848 and 854 are spaced by the OFDM symbols 850 and 852. The gap represented by the OFDM symbols 816 and 818, as well as the OFDM symbols 834 and 836 corresponds to a gap between SSBs that facilitates beam switching, as discussed above with reference to FIGS. 4-6.

Figure 9:
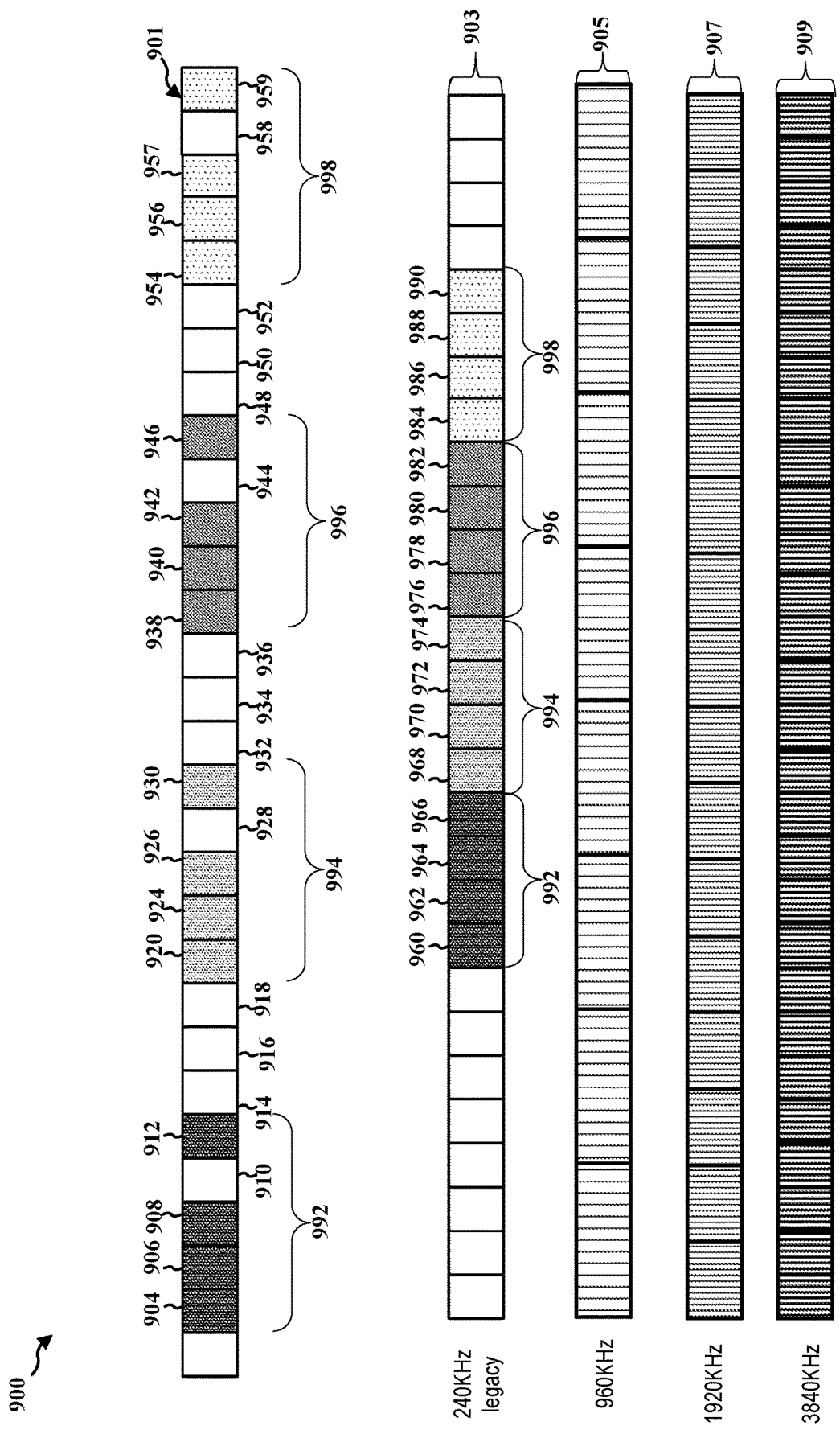
FIG. 9 is a diagram illustrating an example SSB pattern with relatively small gaps introduced between symbols of the SSB and relatively large gaps introduced between multiple SSBs, in accordance with certain aspects of the present description.

FIG. 9 is a diagram 900 illustrating an example SSB pattern 901 with relatively small gaps introduced between OFDM symbols in the SSB pattern 901 and relatively large gaps introduced between multiple SSBs, and as compared to the legacy 240 kHz SCS SSB pattern 903 and corresponding example frame structures of different alternative data SCS values, e.g., a 960 kHz SCS 905, a 1920 kHz SCS 907, and a 3840 kHz SCS 909. The gaps in the SSB pattern 901 are similar to the gaps in the SSB pattern 701 as described above with reference to FIG. 7 or the gaps in the SSB pattern 801 of FIG. 8, however, the gaps in the SSB pattern 901 include a gap of one OFDM symbol between SSB symbols and a gap of three OFDM symbols between SSBs. The SSB pattern 901 may be utilized when a time to switch between downlink transmissions and uplink transmissions is large. In such circumstances, it may be desirable to have a small gap (e.g., 1 OFDM symbol gap between the OFDM symbols of an SSB to transmit an ACK/NACK), and a larger gap (e.g., 3 OFDM symbols gap between the SSBs) to handle the uplink traffic.

The legacy SSB pattern 903 (which is the same as the legacy SSB pattern 703) includes an SSB 992 (with OFDM symbols 960, 962, 964, 966), an SSB 994 (with OFDM symbols 968, 970, 972, 974), an SSB 996 (with OFDM symbols 976, 978, 980, 982) and an SSB 998 (with OFDM symbols 984, 986, 988, 990) and without any gaps between the symbols of the SSBs (i.e., the OFDM symbols 960, 962, 964, etc.) or the multiple SSBs (i.e., the SSB 992, the SSB 994, etc.). The legacy SSB pattern 903 is similar to the pattern of block 607 as described above with reference to FIG. 6.

The SSB pattern 901 is a gap-inserted version of the legacy SSB pattern 903. As indicated by the SSB 992, the OFDM symbols 904, 906, 918 and 912 of the SSB pattern 901 correspond to the OFDM symbols 960, 962, 964 and 966 of the legacy SSB pattern 903. The OFDM symbols 908 and 912 in the SSB pattern 901 are spaced by the OFDM symbol 910.

Similarly, as indicated by the SSB 994, the OFDM symbols 968, 970, 972 and 974 of the legacy SSB pattern 903 correspond to the OFDM symbols 920, 924, 926 and 930 with the difference that the OFDM symbols 926 and 930 are spaced by the OFDM symbol 928. Also, as indicated by the SSB 996, the OFDM symbols 976, 978, 980, and 982 of the legacy SSB pattern 703 correspond to the OFDM symbols 938, 940, 942, and 946 of the SSB pattern 901 with the difference that the OFDM symbols 942 and 946 are spaced by the OFDM symbol 944. Also, as indicated by the SSB 998, the OFDM symbols 984, 986, 988, and 990 of the legacy SSB pattern 703 correspond to the OFDM symbols 954, 956, 957, and 959 of the SSB pattern 901 with the difference that the OFDM symbols 957 and 959 are spaced by the OFDM symbol 958.

The gaps formed by, for example, OFDM symbols 910 and 928 allow transmission of an uplink transmission such as ACK/NACK. In an aspect, the uplink transmission may use the data SCS, which may be greater than the SSB SCS. For example, the data SCS may be 960 kHz SCS 905, 1920 kHz SCS 907, or 3840 kHz SCS 909. These higher SCSs allow multiple symbols to be transmitted during a gap of 1 symbol of the SSB SCS. For example, if the SSB pattern 901 has a frequency of 240 kHz and an uplink data transmission has a SCS of 3.84 MHz, then 1 SSB symbol would be equal to 16 data symbols in time. A gap presented by the OFDM symbols 910 and 928 in the SSB pattern 901, may allow up to 16 symbols of data. This gap may be utilized for sending uplink signals such as ACK/NACK to the transmitter.

Further, the OFDM symbols 912 and 920 are spaced by the OFDM symbols 914, 916 and 918, the OFDM symbols 930 and 938 are spaced by the OFDM symbols 932, 934 and 936, the OFDM symbols 946 and 954 are spaced by the OFDM symbols 948, 950, and 952. The gaps represented by the OFDM symbols 914, 916 and 918, as well as the OFDM symbols 932, 934 and 936, and the OFDM symbols 948, 950, and 952 correspond to gaps between SSBs that facilitate beam switching, as discussed above with reference to FIGS. 4-6.

Figure 10:
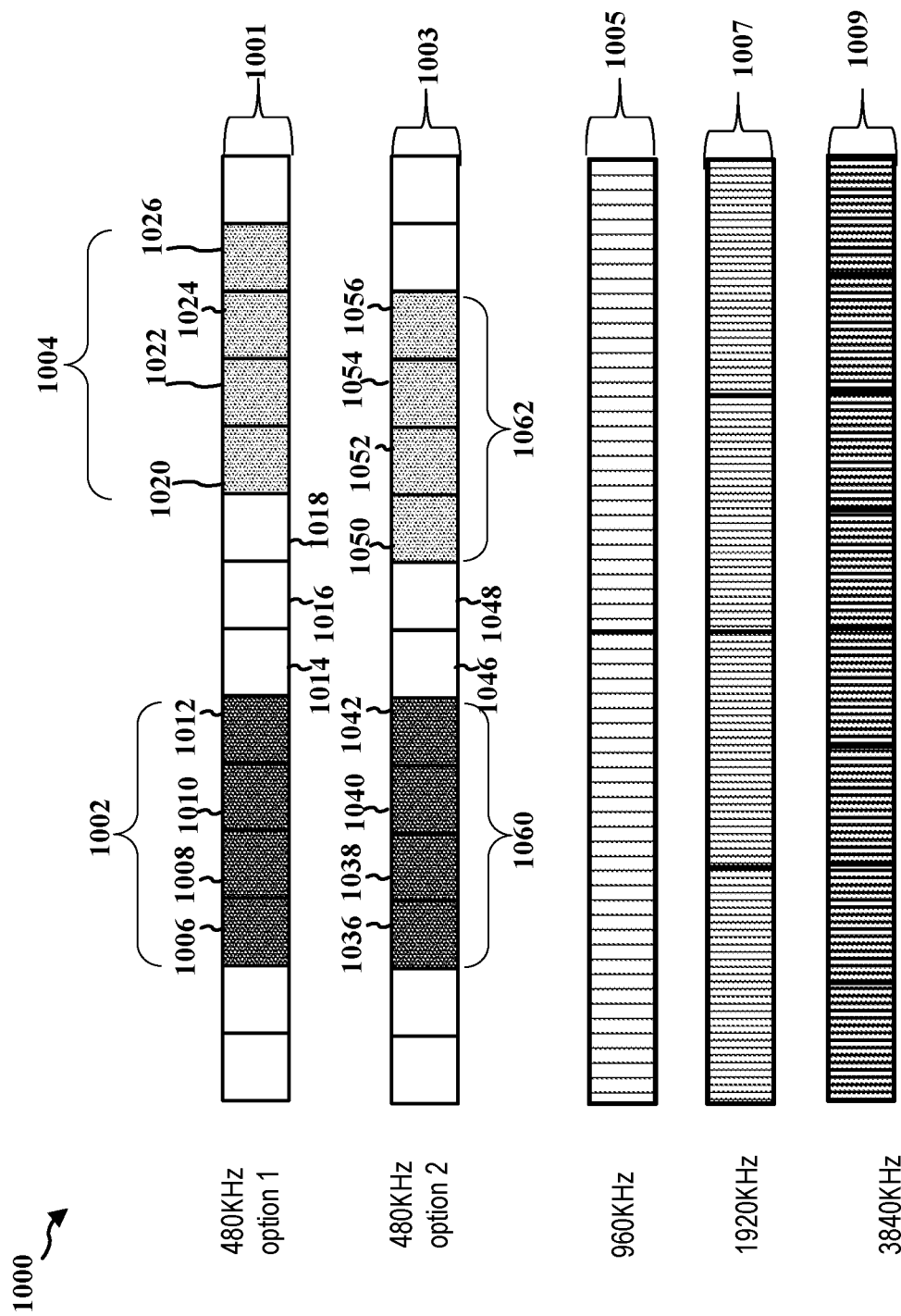
FIG. 10 is a diagram illustrating an example SSB pattern with two options of introducing gaps between multiple SSBs, in accordance with certain aspects of the present description.

FIG. 10 is a diagram 1000 illustrating two options of SSB patterns 1001 and 1003 for introducing gaps between multiple SSBs, as opposed to having gaps within an SSB as discussed above with regard to FIGS. 7-9.

For example, at high SSB SCS such as 480 kHz, spacing between SSB OFDM symbols may not be efficient for transmitting uplink signals such as ACK/NACK as one SSB OFDM symbol may not be equivalent to as many data symbols. For example, for an SSB frequency of 480 kHz and a data signal frequency of 3.84 MHz, one SSB OFDM symbol may only be equal to 8 data symbols. Therefore, at higher frequencies, it may not be efficient to provide spacing between OFDM symbols of an SSB, rather spacing may be provided between multiple SSBs as illustrated in the two SSB patterns 1001 and 1003.

The gaps in the SSB patterns 1001 and 1003 are similar to the gaps in the SSB pattern 701 as described above with reference to FIG. 7, however, the gaps in the SSB patterns 1001 include a gap only between SSBs without any gaps between the SSB OFDM symbols. If the legacy SSB pattern for 240 kHz were extended to 480 kHz, the resulting pattern would include multiple consecutive SSBs with no gaps. As discussed above, the analog beam switching time may be significant due to the shorter symbol period at 480 kHz SCS.

The SSB pattern 1001 includes an SSB 1002 including OFDM symbols 1006, 1008, 1010 and 1012 and an SSB 1004 including OFDM symbols 1020, 1022, 1024 and 1026. The SSB 1002 and SSB 1004 are spaced by the OFDM symbols 1014, 1016 and 1018. The gaps provided by OFDM symbols 1014, 1016 and 1018 may allow analog beam switching between the SSB 1002 and the SSB 1004. In an aspect, the gaps may be sufficient for an uplink transmission such as an uplink ACK/NACK using one of data SCSs 1005, 1007, or 1009.

The SSB pattern 1003 provides another option of SSB pattern design. The SSB pattern 1003 is similar to the SSB pattern 1001 with the difference that the gap between SSBs of the SSB pattern 1003 is 2 OFDM symbols instead of 3 OFDM symbols in the SSB pattern 1001. The SSB pattern 1003 includes an SSB 1060 including OFDM symbols 1036, 1038, 1040 and 1042 and an SSB 1062 including OFDM symbols 1050, 1052, 1054 and 1056. The SSB 1060 and the SSB 1062 are spaced by the OFDM symbols 1046 and 1048. The gaps provided by OFDM symbols 1046 and 1048 may allow analog beam switching between the SSB 1060 and the SSB 1062. In an aspect, the gaps may be sufficient for an uplink transmission such as an uplink ACK/NACK using one of data SCSs 1005, 1007, or 1009.

In an aspect, inserting gaps between SBSs may still allow beam sweeping of a maximum number of beams (e.g., 64) during a half frame (e.g., 5 ms). For example, for the SSB pattern 1001, a repeated pattern may be 2 gap symbols, followed by 4 SSB symbols, 3 gap symbols, 4 SSB symbols, 3 gap symbols, 4 SSB symbols, 3 gap symbols, 4 SSB symbols, and 1 gap symbol, for a total of 28 symbols or 2 slots. At 480 kHz SCS, the 28 symbols or 2 slots may have a duration of 0.0625 ms, so the pattern may be repeated 16 times within 1 ms to provide 64 SSB transmissions.

For the SSB pattern 1003, the repeated pattern may be 2 gap symbols, followed by 4 SSB symbols, 2 gap symbols, 4 SSB symbols, 4 gap symbols, 4 SSB symbols, 2 gap symbols, 4 SSB symbols, and 2 gap symbols for a total of 28 symbols or 2 slots. At 480 kHz SCS, the 28 symbols or 2 slots may have a duration of 0.0625 ms, so the pattern may be repeated 16 times within 1 ms to provide 64 SSB transmissions.

The SSB patterns 1001 and 1003 may also apply to higher SSB SCSs such as 960 kHz. For example, at high SSB frequencies such as 960 kHz, spacing between SSB OFDM symbols may not be efficient, for transmitting uplink signals such as ACK/NACK as one SSB OFDM symbol may not be equivalent as many data symbols. For example, for an SSB frequency of 960 kHz and a data signal frequency of 3.84 MHz, one SSB OFDM symbol may only be equal to 4 data symbols. Therefore, at higher SSB SCSs, it may not be efficient to provide spacing between OFDM symbols of an SSB, rather spacing may be provided between multiple SSBs as illustrated in the two SSB patterns 1001 and 1003.

In an aspect, inserting gaps between SBSs may still allow beam sweeping of a maximum number of beams (e.g., 64) during a half frame (e.g., 5 ms). For example, for the SSB pattern 1001, a repeated pattern may be 2 gap symbols, followed by 4 SSB symbols, 3 gap symbols, 4 SSB symbols, 3 gap symbols, 4 SSB symbols, 3 gap symbols, 4 SSB symbols, and 1 gap symbol, for a total of 28 symbols or 2 slots. At 960 kHz SCS, the 28 symbols or 2 slots may have a duration of 0.0312 ms, so the pattern may be repeated 16 times within 0.5 ms to provide 64 SSB transmissions.

For the SSB pattern 1003, the repeated pattern may be 2 gap symbols, followed by 4 SSB symbols, 2 gap symbols, 4 SSB symbols, 4 gap symbols, 4 SSB symbols, 2 gap symbols, 4 SSB symbols, and 2 gap symbols for a total of 28 symbols or 2 slots. At 960 kHz SCS, the 28 symbols or 2 slots may have a duration of 0.312 ms, so the pattern may be repeated 16 times within 0.5 ms to provide 64 SSB transmissions.

Figure 11:
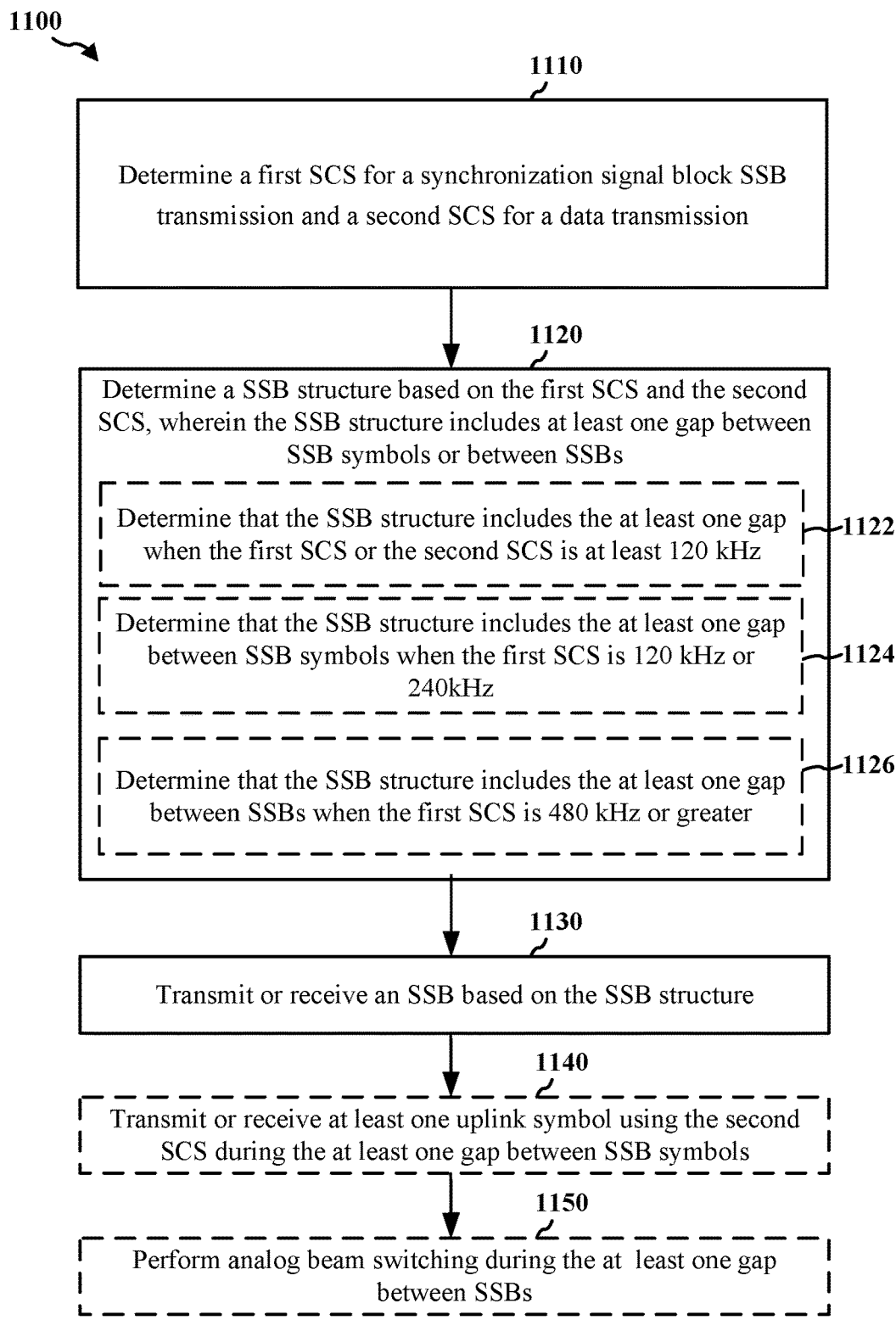
FIG. 11 is a flowchart of an example method for transmitting or receiving a synchronization signal block, in accordance with certain aspects of the present description.

FIG. 11 is a flowchart of an example method 1100 for transmitting or receiving a synchronization signal block. The method 1100 may be performed by a UE (such as the UE 104, which may include the memory 360 and which may be the entire UE 104 or a component of the UE 104 such as the SSB component 140, TX processor 368, the RX processor 356, or the controller/processor 359) for determining a structure of the SSB. The method 1100 may be performed by the SSB component 140 in communication with the SSB component 198 of the base station 102.

At block 1110, the method 1100 may include determining a first SCS for a SSB transmission and a second SCS for a data transmission. In an aspect, for example, the UE 104, or the controller/processor 359 may execute the SSB component 140 and/or the configuration component 141 to determine a first SCS for a SSB transmission and a second SCS for a data transmission. Accordingly, the UE 104, RX processor 356 or the controller/processor 359 executing the SSB component 140 or the configuration component 141 may provide means for determining a first SCS for a SSB transmission and a second SCS for a data transmission.

At block 1120, the method 1100 may include determining a SSB structure based on the first SCS and the second SCS, wherein the SSB structure includes at least one gap between SSB symbols or between SSBs. In an aspect, for example, the UE 104, or the controller/processor 359 may execute the SSB component 140 and/or the structure component 142 to determine a SSB structure based on the first SCS and the second SCS, wherein the SSB structure includes at least one gap between SSB symbols or between SSBs. For example, at sub-block 1122, the structure component 142 may determine that the SSB structure includes the at least one gap when the first SCS or the second SCS is at least 120 kHz. As another example, at sub-block 1124, the structure component 142 may determine that the SSB structure includes the at least one gap between SSB symbols when the first SCS is 120 kHz or 240 kHz. As another example, at block 1126, the structure component 142 may determine that the SSB structure includes the at least one gap between SSBs when the first SCS is 480 kHz or greater. Accordingly, the UE 104, RX processor 356 or the controller/processor 359 executing the SSB component 140 or the structure component 142 may provide means for determining a SSB structure based on the first SCS and the second SCS, wherein the SSB structure includes at least one gap between SSB symbols or between SSBs.

At block 1130, the method 1100 may include transmitting or receiving an SSB based on the SSB structure. In an aspect, for example, the UE 104, or the controller/processor 359 may execute the SSB component 140 and/or the communication component 143 to transmit or receive an SSB based on the SSB structure. Accordingly, the UE 104, RX processor 356 or the controller/processor 359 executing the SSB component 140 or the communication component 143 may provide means for transmitting or receiving an SSB based on the SSB structure.

At block 1140, the method 1100 may include transmitting or receiving at least one uplink symbol using the second SCS during the at least one gap between SSB symbols. In an aspect, for example, the UE 104, or the controller/processor 359 may execute the SSB component 140 and/or the uplink component 144 to transmit or receive at least one uplink symbol using the second SCS during the at least one gap between SSB symbols. Accordingly, the UE 104, RX processor 356 or the controller/processor 359 executing the SSB component 140 or the uplink component 144 may provide means for transmitting or receiving at least one uplink symbol using the second SCS during the at least one gap between SSB symbols.

At block 1150, the method 1100 may include transmitting or receiving at least one uplink symbol using the second SCS during the at least one gap between SSB symbols. In an aspect, for example, the UE 104, or the controller/processor 359 may execute the SSB component 140 and/or the beam switching component 145 to perform analog beam switching during the at least one gap between SSBs. Accordingly, the UE 104, RX processor 356 or the controller/processor 359 executing the SSB component 140 or the beam switching component 145 may provide means for transmitting or receiving at least one uplink symbol using the second SCS during the at least one gap between SSB symbols.

Figure 12:
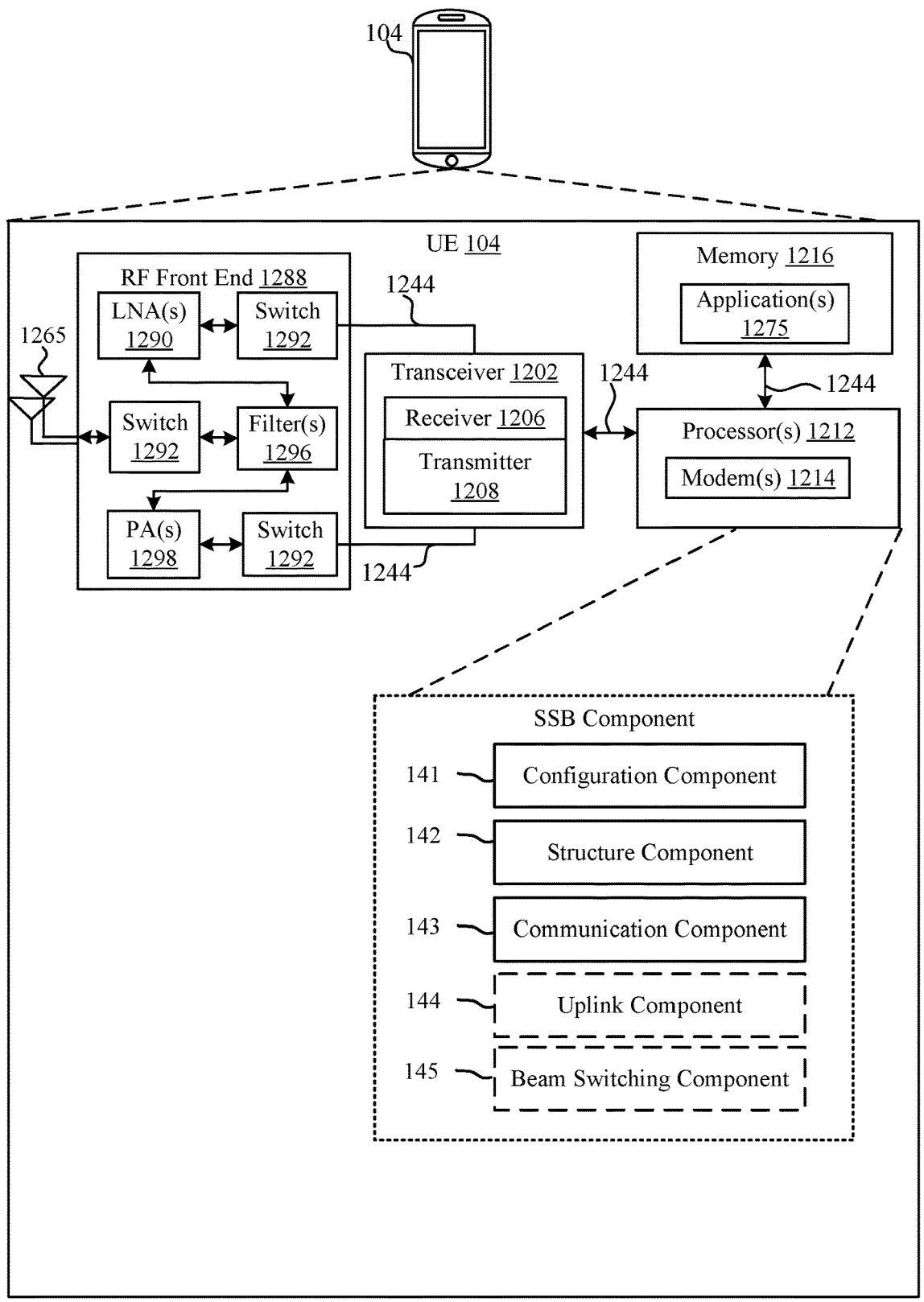
FIG. 12 is a schematic diagram of example components of the UE of FIG. 1, in accordance with certain aspects of the present description.

Referring to FIG. 12, one example of an implementation of UE 104 may include a variety of components, some of which have already been described above, but including components such as one or more processors 1212 and memory 1216 and transceiver 1202 in communication via one or more buses 1244, which may operate in conjunction with modem 1214, and SSB component 140 to enable one or more of the functions described herein related to receiving an SSB at a UE 104. Further, the one or more processors 1212, modem 1214, memory 1216, transceiver 1202, RF front end 1288 and one or more antennas 1265 may be configured to support voice and/or data calls (simultaneously or non-simultaneously) in one or more radio access technologies. The antennas 1265 may include one or more antennas, antenna elements, and/or antenna arrays.

In an aspect, the one or more processors 1212 may include a modem 1214 that uses one or more modem processors. The various functions related to SSB component 140 may be included in modem 1214 and/or processors 1212 and, in an aspect, may be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1214 associated with SSB component 140 may be performed by transceiver 1202.

Also, memory 1216 may be configured to store data used herein and/or local versions of applications 1275, SSB component 140 and/or one or more of subcomponents thereof being executed by at least one processor 1212. Memory 1216 may include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining SSB component 140 and/or one or more of subcomponents thereof, and/or data associated therewith, when UE 104 is operating at least one processor 1212 to execute SSB component 140 and/or one or more subcomponents thereof.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 102. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 104 may include RF front end 1288, which may operate in communication with one or more antennas 1265 and transceiver 1202 for receiving and transmitting radio transmissions, for example, wireless communications transmitted by at least one base station 102 or wireless transmissions transmitted by UE 104. RF front end 1288 may be connected to one or more antennas 1265 and may include one or more low-noise amplifiers (LNAs) 1290, one or more switches 1292, one or more power amplifiers (PAs) 1298, and one or more filters 1296 for transmitting and receiving RF signals.

In an aspect, LNA 1290 may amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 may be used by RF front end 1288 to filter a received signal to obtain an input RF signal. Similarly, in an aspect, for example, a respective filter 1296 may be used to filter an output from a respective PA 1298 to produce an output signal for transmission. In an aspect, each filter 1296 may be connected to a specific LNA 1290 and/or PA 1298. In an aspect, RF front end 1288 may use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver 1202 may be tuned to operate at specified frequencies such that UE 104 can communicate with, for example, one or more base stations 102 or one or more cells associated with one or more base stations 102. In an aspect, for example, modem 1214 may configure transceiver 1202 to operate at a specified frequency and power level based on the UE configuration of the UE 104 and the communication protocol used by modem 1214.

In an aspect, modem 1214 may be a multiband-multimode modem, which can process digital data and communicate with transceiver 1202 such that the digital data is sent and received using transceiver 1202. In an aspect, modem 1214 may be multiband and be configured to support multiple frequency bands for a specific communications protocol. In an aspect, modem 1214 may be multimode and be configured to support multiple operating networks and communications protocols. In an aspect, modem 1214 may control one or more components of UE 104 (e.g., RF front end 1288, transceiver 1202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 13:
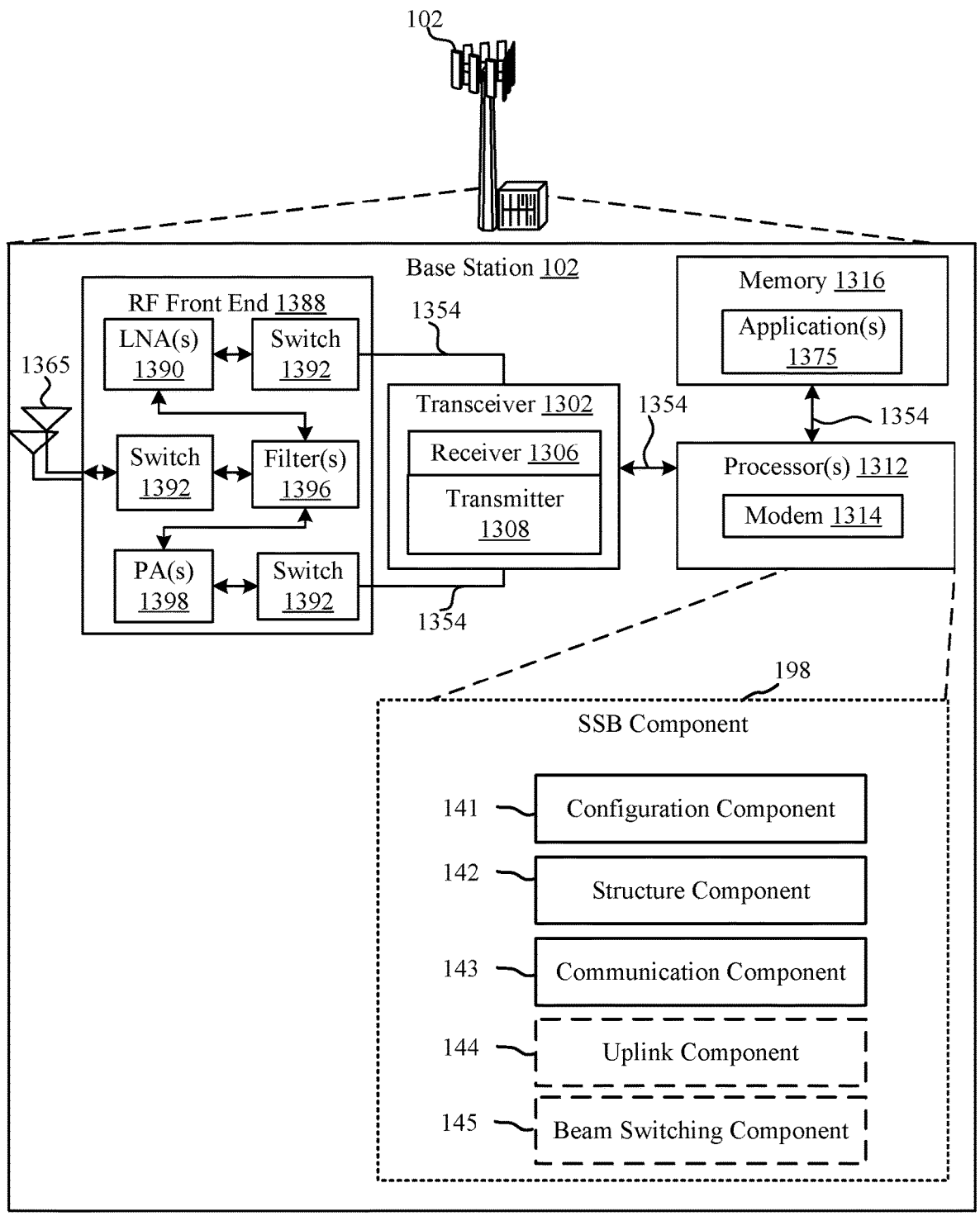
FIG. 13 is a schematic diagram of example components of the base station of FIG. 1, in accordance with certain aspects of the present description.

Referring to FIG. 13, one example of an implementation of base station 102 may include a variety of components, some of which have already been described above, but including components such as one or more processors 1312 and memory 1316 and transceiver 1302 in communication via one or more buses 1354, which may operate in conjunction with modem 1314 and SSB component 198 to enable one or more of the functions described herein related to transmitting SSBs.

The transceiver 1302, receiver 1306, transmitter 1308, one or more processors 1312, memory 1316, applications 1375, buses 1354, RF front end 1388, LNAs 1390, switches 1392, filters 1396, PAs 1398, and one or more antennas 1365 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

SOME FURTHER EXAMPLE CLAUSES

Implementation examples are described in the following numbered clauses:

1. A method of wireless communication, comprising:
   determining a first sub-carrier spacing (SCS) for a synchronization signal block (SSB) transmission and a second SCS for a data transmission;
   determining a SSB structure based on the first SCS and the second SCS, wherein the SSB structure includes at least one gap between SSB symbols or between SSBs; and
   transmitting or receiving an SSB based on the SSB structure.

2. The method of clause 1, wherein determining the SSB structure based on the first SCS and the second SCS comprises determining that the SSB structure includes the at least one gap when the first SCS or the second SCS is at least 120 kHz.

3. The method of clause 1 or 2, wherein determining the SSB structure based on the first SCS and the second SCS comprises determining that the SSB structure includes the at least one gap between SSB symbols when the first SCS is 120 kHz or 240 kHz.

4. The method of clause 3, wherein determining the SSB structure based on the first SCS and the second SCS comprises determining that a ratio between the second SCS and the first SCS is at least 4.

5. The method of clause 3 or 4, further comprising transmitting or receiving at least one uplink symbol using the second SCS during the at least one gap between SSB symbols.

6. The method of any of clauses 3-5, wherein a length of the at least one gap is a function of the first SCS and the second SCS.

7. The method of clause 6, wherein the length of the at least one gap is at least a number of symbols of the first SCS that includes a full slot of the second SCS and time for beam and direction switching.

8. The method of clause 7, wherein the full slot of the second SCS is not aligned with a slot boundary of the first SCS.

9. The method of any of clauses clause 1-8, wherein determining the SSB structure based on the first SCS and the second SCS comprises determining that the SSB structure includes the at least one gap between SSBs when the first SCS is 480 kHz or greater.

10. The method of clause 9, further comprising performing analog beam switching during the at least one gap between SSBs.

11. The method of clause 9 or 10, wherein the at least one gap between SSBs includes at least one gap between every pair of SSBs.

12. An apparatus for wireless communication, comprising:
   a memory; and
   at least one processor coupled to the memory and configured to:
      determine a first sub-carrier spacing (SCS) for a synchronization signal block (SSB) transmission and a second SCS for a data transmission;

determine a SSB structure based on the first SCS and the second SCS, wherein the SSB structure includes at least one gap between SSB symbols or between SSBs; and transmit or receive an SSB based on the SSB structure.

13. The apparatus of clause 12, wherein the at least one processor is configured to determine that the SSB structure includes the at least one gap when the first SCS or the second SCS is at least 120 kHz.

14. The apparatus of clause 12 or 13, wherein the at least one processor is configured to determine that the SSB structure includes the at least one gap between SSB symbols when the first SCS is 120 kHz or 240 kHz.

15. The apparatus of clause 14, wherein the at least one processor is configured to determine that a ratio between the second SCS and the first SCS is at least 4.

16. The apparatus of clause 14 or 15, wherein the at least one processor is configured to transmit or receive at least one uplink symbol using the second SCS during the at least one gap between SSB symbols.

17. The apparatus of any of clauses 14-16, wherein a length of the at least one gap is a function of the first SCS and the second SCS.

18. The apparatus of clause 17, wherein the length of the at least one gap is at least a number of symbols of the first SCS that includes a full slot of the second SCS and time for beam and direction switching.

19. The apparatus of clause 18, wherein the full slot of the second SCS is not aligned with a slot boundary of the first SCS.

20. The apparatus of any of clauses 12-19, wherein the at least one processor is configured to determine that the SSB structure includes the at least one gap between SSBs when the first SCS is 480 kHz or greater.

21. The apparatus of clause 20, wherein the at least one processor is configured to perform analog beam switching during the at least one gap between SSBs.

22. The apparatus of clause 20 or 21, wherein the at least one gap between SSBs includes at least one gap between every pair of SSBs.

23. An apparatus for wireless communication, comprising:

means for determining a first sub-carrier spacing (SCS) for a synchronization signal block (SSB) transmission and a second SCS for a data transmission;

means for determining a SSB structure based on the first SCS and the second SCS, wherein the SSB structure includes at least one gap between SSB symbols or between SSBs; and means for transmitting or receiving an SSB based on the SSB structure.

24. The apparatus of clause 23, wherein the means for determining the SSB structure is configured to determine that the SSB structure includes the at least one gap when the first SCS or the second SCS is at least 120 kHz.

25. The apparatus of clause 23 or 24, wherein the means for determining the SSB structure is configured to determine that the SSB structure includes the at least one gap between SSB symbols when the first SCS is 120 kHz or 240 kHz.

26. The apparatus of clause 25, wherein the means for transmit or receiving is configured to transmit or receive at least one uplink symbol using the second SCS during the at least one gap between SSB symbols.

27. The apparatus of clause 25 or 26, wherein a length of the at least one gap is at least a number of symbols of the first SCS that includes a full slot of the second SCS and time for beam and direction switching.

28. The apparatus of any of clauses 23-27, wherein the means for determining the SSB structure is configured to determine that the SSB structure includes the at least one gap between SSBs when the first SCS is 480 kHz or greater.

29. The apparatus of clause 28, further comprising means for performing analog beam switching during the at least one gap between SSBs.

30. A non-transitory computer-readable medium storing computer executable code, the code when executed by a processor cause the processor to:

determine a first sub-carrier spacing (SCS) for a synchronization signal block (SSB) transmission and a second SCS for a data transmission;

determine a SSB structure based on the first SCS and the second SCS, wherein the SSB structure includes at least one gap between SSB symbols or between SSBs; and transmit or receive an SSB based on the SSB structure.

What is claimed is:

1. A method of wireless communication by a wireless communication device, comprising:

determining a first sub-carrier spacing (SCS) for a synchronization signal block (SSB) transmission and a second SCS for a data transmission, wherein the second SCS is different than the first SCS;

determining a SSB structure based on the first SCS and the second SCS, wherein the SSB structure includes a plurality of SSB transmissions, each SSB transmission comprising four SSB symbols, wherein there is at least one gap between the SSB symbols of a single SSB transmission; and transmitting or receiving an SSB based on the SSB structure; and transmitting or receiving at least one uplink symbol using the second SCS during the at least one gap between the SSB symbols of the single SSB transmission.

2. The method of claim 1, wherein determining the SSB structure based on the first SCS and the second SCS comprises determining that the SSB structure includes the at least one gap when the first SCS or the second SCS is at least 120 kHz.

3. The method of claim 1, wherein determining the SSB structure based on the first SCS and the second SCS comprises determining that the SSB structure includes the at least one gap between SSB symbols of the SSB when the first SCS is 120 kHz or 240 kHz.

4. The method of claim 3, wherein determining the SSB structure based on the first SCS and the second SCS comprises determining that a ratio between the second SCS and the first SCS is at least 4.

5. The method of claim 3, wherein a length of the at least one gap is a function of the first SCS and the second SCS.

6. The method of claim 5, wherein the length of the at least one gap is at least a number of symbols of the first SCS that includes a full slot of the second SCS and time for beam and direction switching.

7. The method of claim 6, wherein the full slot of the second SCS is not aligned with a slot boundary of the first SCS.

8. The method of claim 1, wherein determining the SSB structure based on the first SCS and the second SCS comprises determining that the SSB structure includes the at least one gap between SSBs when the first SCS is 480 kHz or greater.

9. The method of claim 8, further comprising performing analog beam switching during the at least one gap between SSBs.

10. The method of claim 8, wherein the at least one gap between SSBs includes at least one gap between every pair of SSBs.

11. An apparatus for wireless communication, comprising:
a memory; and
at least one processor coupled to the memory and configured to:
determine a first sub-carrier spacing (SCS) for a synchronization signal block (SSB) transmission and a second SCS for a data transmission, wherein the second SCS is different than the first SCS;
determine a SSB structure based on the first SCS and the second SCS, wherein the SSB structure includes a plurality of SSB transmissions, each SSB transmission comprising four SSB symbols, wherein there is at least one gap between the SSB symbols of a single SSB transmission;
transmit or receive an SSB based on the SSB structure; and
transmit or receive at least one uplink symbol using the second SCS during the at least one gap between the SSB symbols of the single SSB transmission.

12. The apparatus of claim 11, wherein the at least one processor is configured to determine that the SSB structure includes the at least one gap when the first SCS or the second SCS is at least 120 kHz.

13. The apparatus of claim 11, wherein the at least one processor is configured to determine that the SSB structure includes the at least one gap between SSB symbols of the SSB when the first SCS is 120 kHz or 240 kHz.

14. The apparatus of claim 13, wherein the at least one processor is configured to determine that a ratio between the second SCS and the first SCS is at least 4.

15. The apparatus of claim 13, wherein a length of the at least one gap is a function of the first SCS and the second SCS.

16. The apparatus of claim 15, wherein the length of the at least one gap is at least a number of symbols of the first SCS that includes a full slot of the second SCS and time for beam and direction switching.

17. The apparatus of claim 16, wherein the full slot of the second SCS is not aligned with a slot boundary of the first SCS.

18. The apparatus of claim 11, wherein the at least one processor is configured to determine that the SSB structure includes the at least one gap between SSBs when the first SCS is 480 kHz or greater.

19. The apparatus of claim 18, wherein the at least one processor is configured to perform analog beam switching during the at least one gap between SSBs.

20. The apparatus of claim 18, wherein the at least one gap between SSBs includes at least one gap between every pair of SSBs.

21. An apparatus for wireless communication, comprising:
means for determining a first sub-carrier spacing (SCS) for a synchronization signal block (SSB) transmission and a second SCS for a data transmission, wherein the second SCS is different than the first SCS;
means for determining a SSB structure based on the first SCS and the second SCS, wherein the SSB structure includes a plurality of SSB transmissions, each SSB transmission comprising four SSB symbols, wherein there is at least one gap between the SSB symbols of a single SSB transmission; and
means for transmitting or receiving an SSB based on the SSB structure, wherein the means for transmitting or receiving is configured to transmit or receive at least one uplink symbol using the second SCS during the at least one gap between the SSB symbols of the single SSB transmission.

22. The apparatus of claim 21, wherein the means for determining the SSB structure is configured to determine that the SSB structure includes the at least one gap when the first SCS or the second SCS is at least 120 kHz.

23. The apparatus of claim 21, wherein the means for determining the SSB structure is configured to determine that the SSB structure includes the at least one gap between SSB symbols of the SSB when the first SCS is 120 kHz or 240 kHz.

24. The apparatus of claim 23, wherein a length of the at least one gap is at least a number of symbols of the first SCS that includes a full slot of the second SCS and time for beam and direction switching.

25. The apparatus of claim 21, wherein the means for determining the SSB structure is configured to determine that the SSB structure includes the at least one gap between SSBs when the first SCS is 480 kHz or greater.

26. The apparatus of claim 25, further comprising means for performing analog beam switching during the at least one gap between SSBs.

27. A non-transitory computer-readable medium storing computer executable code, the code when executed by a processor cause the processor to:
determine a first sub-carrier spacing (SCS) for a synchronization signal block (SSB) transmission and a second SCS for a data transmission, wherein the second SCS is different than the first SCS;
determine a SSB structure based on the first SCS and the second SCS, wherein the SSB structure includes a plurality of SSB transmissions, each SSB transmission comprising four SSB symbols, wherein there is at least one gap between the SSB symbols of a single SSB transmission;
transmit or receive an SSB based on the SSB structure; and
transmit or receive at least one uplink symbol using the second SCS during the at least one gap between the SSB symbols of the single SSB transmission.

* * * * *